(12) United States Patent
Epp et al.

(10) Patent No.: US 11,346,004 B2
(45) Date of Patent: May 31, 2022

(54) PREPARATION OF 7XXX ALUMINUM ALLOYS FOR ADHESIVE BONDING

(71) Applicant: ARCONIC INC., Pittsburgh, PA (US)

(72) Inventors: June M. Epp, Pittsburgh, PA (US); Ali Unal, Export, PA (US)

(73) Assignee: ARCONIC TECHNOLOGIES LLC, Pittsburgh, PA (US)

( * ) Notice: Subject to any disclaimer, the term of this patent is extended or adjusted under 35 U.S.C. 154(b) by 0 days.

(21) Appl. No.: 16/725,129

(22) Filed: Dec. 23, 2019

(65) Prior Publication Data

US 2020/0141006 A1  May 7, 2020

Related U.S. Application Data

(63) Continuation of application No. PCT/US2018/039789, filed on Jun. 27, 2018.
(Continued)

(51) Int. Cl.
| | | |
|---|---|---|
| C23C 22/56 | (2006.01) |
| B23K 26/361 | (2014.01) |
| B23K 26/40 | (2014.01) |
| C09J 5/02 | (2006.01) |
| C23C 22/73 | (2006.01) |

(Continued)

(52) U.S. Cl.
CPC .......... *C23C 22/56* (2013.01); *B23K 26/3584* (2018.08); *B23K 26/36* (2013.01); *B23K 26/361* (2015.10); *B23K 26/362* (2013.01); *B23K 26/40* (2013.01); *C09J 5/02* (2013.01); *C23C 22/73* (2013.01); *B23K 2103/10* (2018.08); *C09J 2301/416* (2020.08); *C09J 2400/166* (2013.01)

(58) Field of Classification Search
CPC ............ C23C 22/56; C23C 22/73; C09J 5/02; C09J 2301/416; C09J 2400/166; B23K 26/361; B23K 26/3584; B23K 26/36; B23K 26/362; B23K 26/40; B23K 2103/10
USPC ....................... 219/121.69, 121.71
See application file for complete search history.

(56) References Cited

U.S. PATENT DOCUMENTS

| | | |
|---|---|---|
| 2,353,786 A | 7/1944 | Ross |
| 2,762,694 A | 9/1956 | Newman |
| 4,097,270 A | 6/1978 | Rao et al. |
| 4,149,912 A | 4/1979 | Craighead et al. |

(Continued)

FOREIGN PATENT DOCUMENTS

| | | |
|---|---|---|
| CN | 106763042 A | 5/2017 |
| WO | WO02/031073 | 4/2002 |

OTHER PUBLICATIONS

International Search Report and Written Opinion, dated Oct. 26, 2018, from related International Patent App. No. PCT/US2018/039789.

(Continued)

*Primary Examiner* — Phuong T Nguyen
(74) *Attorney, Agent, or Firm* — Greenberg Traurig, LLP

(57) ABSTRACT

A preparation method for adhesive bonding of magnesium-containing aluminum alloy products includes a magnesium-containing aluminum alloy product including a matrix and a surface oxide layer overlying the matrix. The magnesium-containing aluminum alloy product also includes intermetallic particles at least proximal the surface oxide layer. The method also includes ablating at least some of the intermetallic particles via an energy source, and in the absence of melting of the matrix of the magnesium-containing aluminum alloy product.

15 Claims, 23 Drawing Sheets

Related U.S. Application Data

(60) Provisional application No. 62/526,247, filed on Jun. 28, 2017.

(51) Int. Cl.
  *B23K 26/362* (2014.01)
  *B23K 26/36* (2014.01)
  *B23K 26/352* (2014.01)
  *B23K 103/10* (2006.01)

(56) References Cited

U.S. PATENT DOCUMENTS

| | | | |
|---|---|---|---|
| 5,190,596 | A | 3/1993 | Timsit |
| 5,277,788 | A | 1/1994 | Nitowski et al. |
| 6,117,794 | A | 9/2000 | Dormer et al. |
| 6,167,609 | B1 * | 1/2001 | Marinelli ............... C23C 22/56 29/469.5 |
| 6,485,541 | B1 | 11/2002 | Hryn et al. |
| 7,267,158 | B2 | 9/2007 | Kolek et al. |
| 8,414,711 | B2 | 4/2013 | Uchida et al. |
| 8,540,826 | B2 | 9/2013 | Ray et al. |
| 2006/0032757 | A1 | 2/2006 | Brevnov et al. |
| 2008/0213612 | A1 | 9/2008 | Starikov et al. |
| 2010/0243108 | A1 | 9/2010 | Karabin et al. |
| 2011/0315658 | A1 | 12/2011 | Shibata et al. |
| 2015/0075756 | A1 * | 3/2015 | Garosshen ............... C23F 1/14 165/133 |

OTHER PUBLICATIONS

ASTM Designation F2792-12a, "Standard Terminology for Additive Manufacturing Technologies," ASTM International, Conshohocken, PA, US, 2014.

Chan, C. P., et al., "The effect of excimer laser surface treatment on the pitting corrosion fatigue behavior of aluminium alloy 7075", J. Materials Science 38:2689-2702 (2003).

Critchlow, G. W., et al., "Initial investigation into the effectiveness of CO2-laser treatment of aluminium for adhesive bonding", *Int. J. Adhesion and Adhesives* 15:233-236 (1995).

Das, S. K., et al., "Reduction of oxidative melt loss of aluminum and its alloys, final report", DE-FC36-00ID13898, Argonne National Laboratory, Argonne, IL, et al., Feb. 2006.

Hughes, Anthony E., et al., "High strength Al-alloys: microstructure, corrosion and principles of protection", pp. 223-262, Recent Trends in Processing and Degradation of Aluminium Alloys, Prof. Zaki Ahmad (Ed.) (2011).

Kaufherr, N. et al., "Chemical cleaning of aluminum alloy surfaces for use as vacuum materials in synchrotron light sources", 36th Annual Symposium of the American Vacuum Society, Oct. 23-27, 1989.

Kim, K. H., "Formation of endogenous MgO and $MgAl_2O_4$ particles and their possibility of acting as substrate for heterogeneous nucleation of aluminum grains", *Surface and Interface Analysis*, 47:429-438, Jan. 2015.

Rechner, R., et al., "Influence on the strength and aging resistance of aluminium joints by laser pre-treatment and surface modification", *Int. J. of Adhesion & Adhesives* 30:595-601 (2010).

Stammen, E., et al., "Surface modification with laser pretreatment of aluminium alloys for adhesive bonding", *Plasma Process. Polym.* 2007:S39-S-43 (2007).

Wefers, K. "Properties and characterization of surface oxides on aluminum alloys", May 20, 1981.

Wu, Yongrong, et al. "Methods improving aluminum adhesive bonding", pp. 1-16, Sheet Metal Welding Conference XVII, Livonia, MI, Oct. 19-20, 2016.

Yue, T. M., et al., "Excimer laser surface treatment of aluminum alloy AA7075 to improve corrosion resistance", *Surface and Coatings Technology* 179:158-164 (2004).

Yue, T. M., et al., "The effect of laser surface treatment on stress corrosion cracking behavior of 7075 aluminium alloy", *Materials Letters* 58:630-635 (2004).

Yulan, Li, et al., "Study on Al alloy surfaces treated by ion beams", Materials Science Forum vols. 561-565, pp. 211-214, 2007 Trans Tech Publications, Switzerland (2007).

Rebegeau, S. A., et al., "Laser ablation of a Cu—Al—Ni combinatorial thin film library: analysis of crater morphology and geometry", *Appl. Phys. A* (2016) 122:1074, pp. 1-9.

* cited by examiner

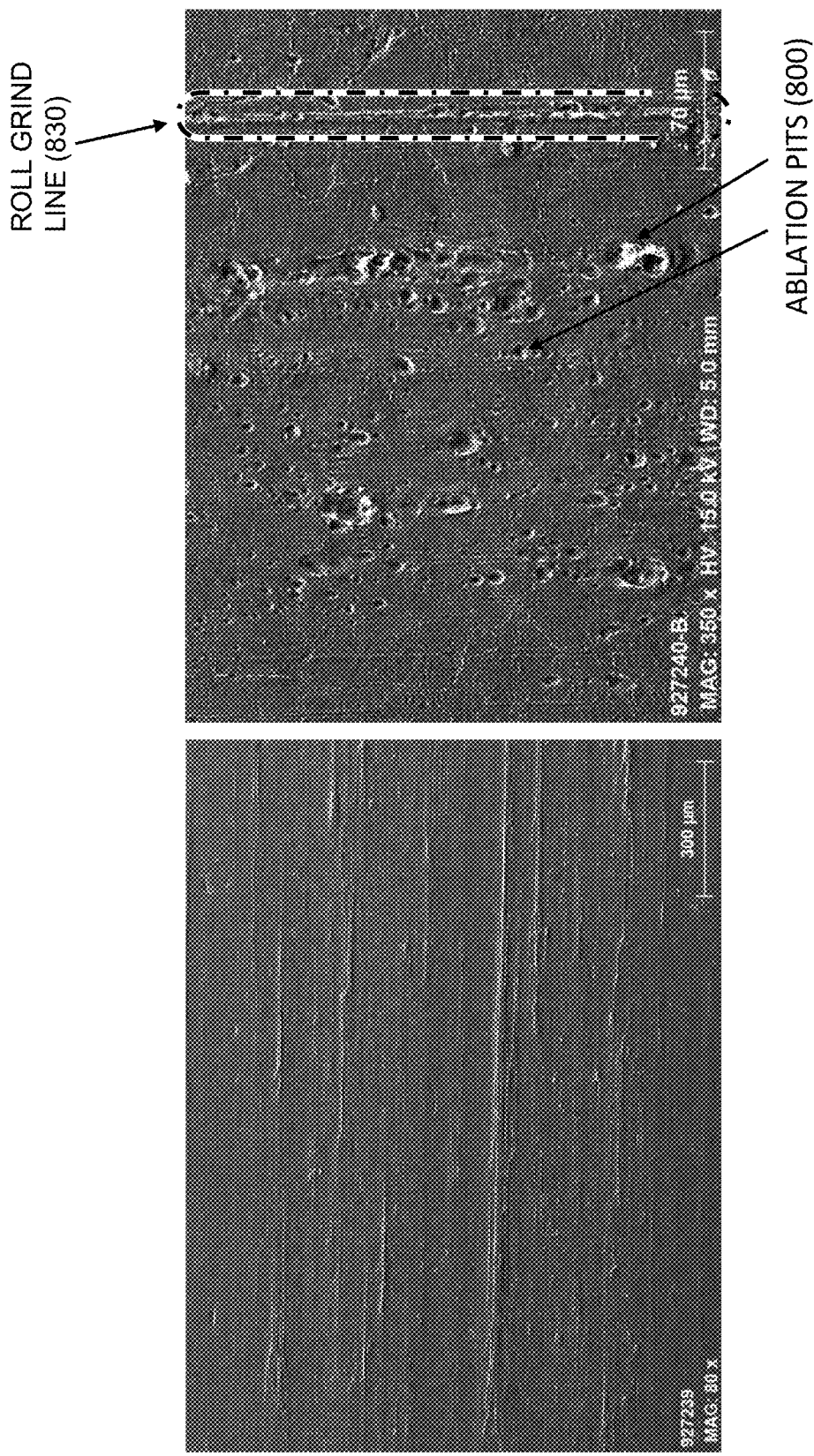

Wrinkles (810)

Wrinkles (810)

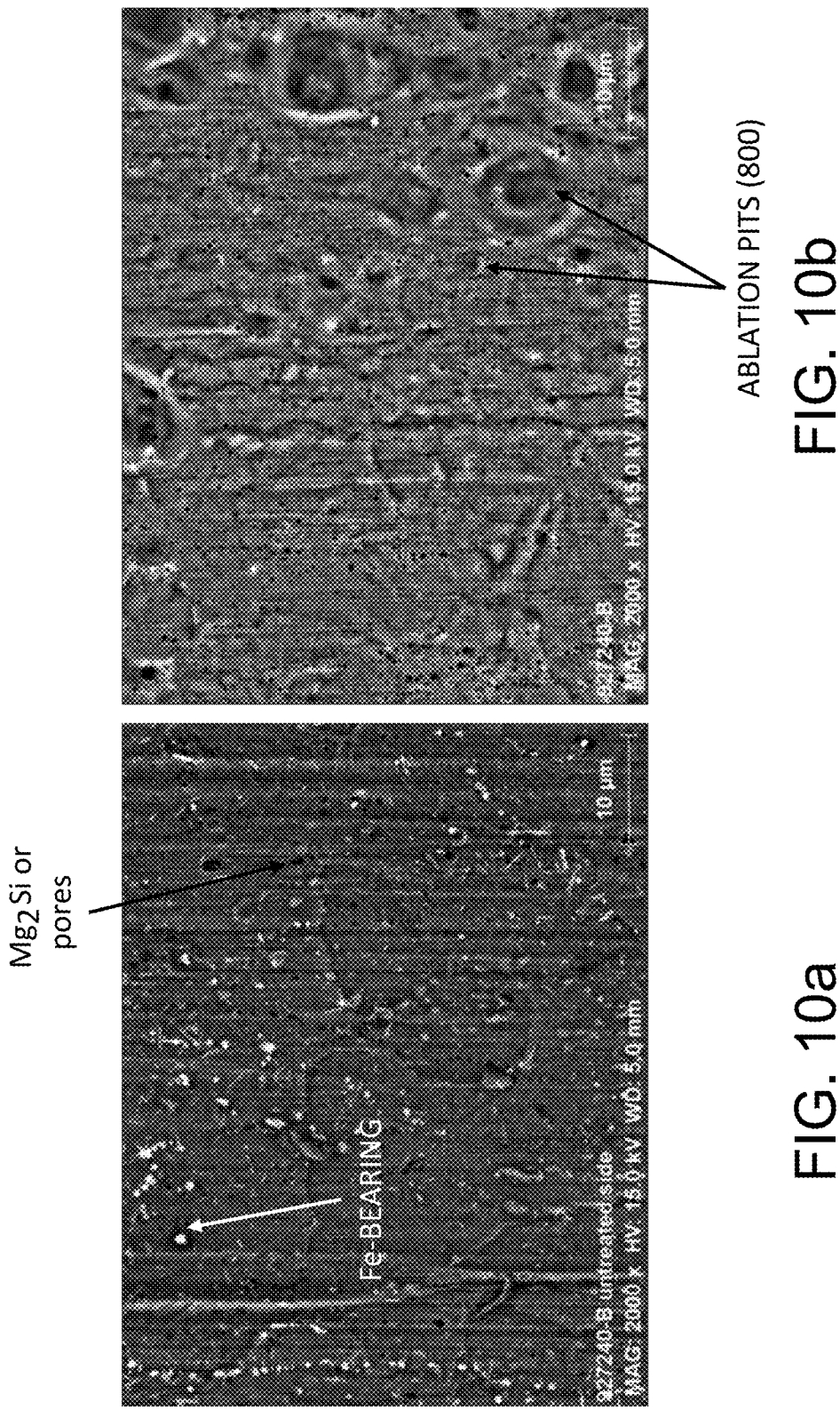

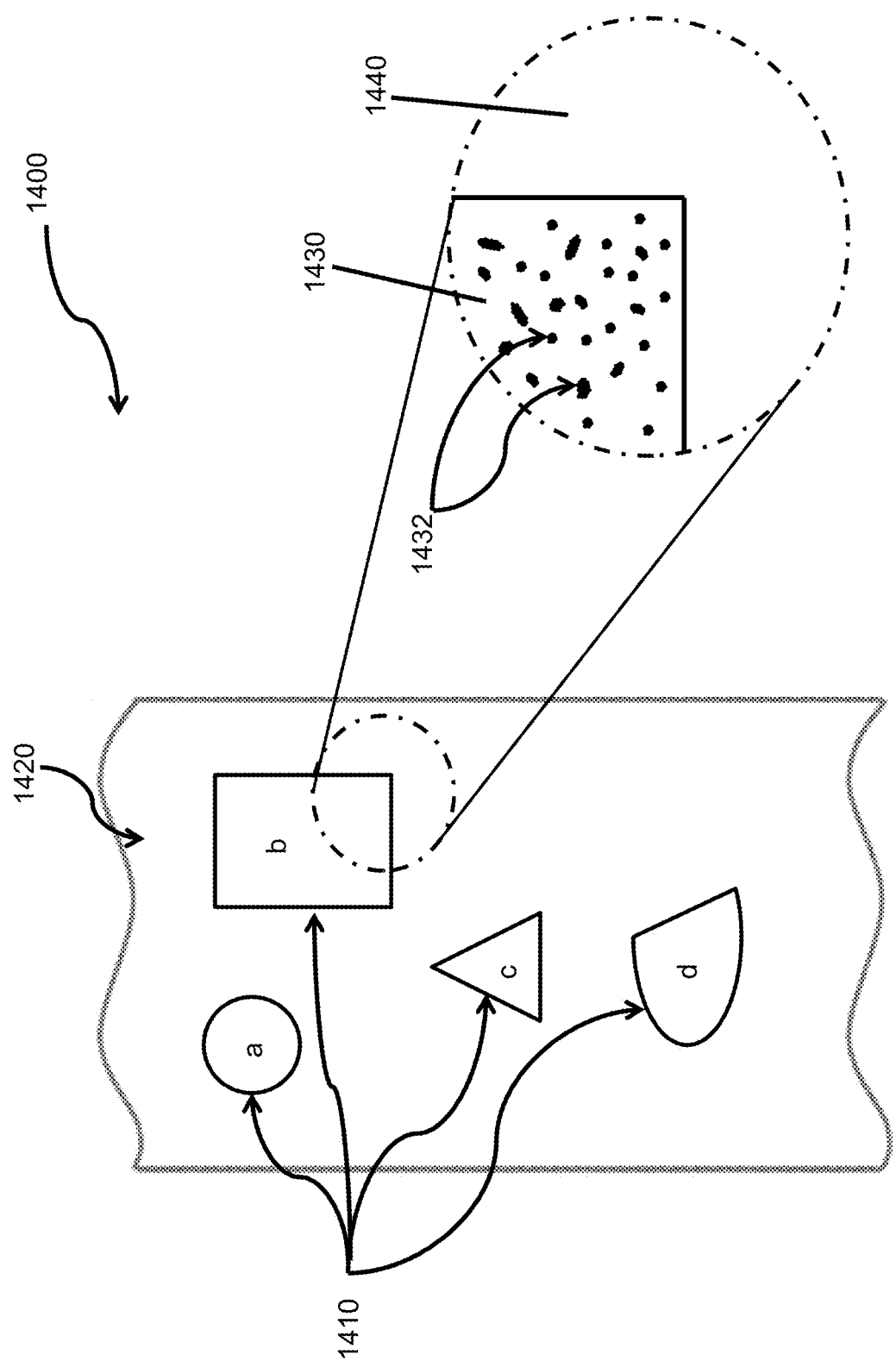

PREPARATION OF 7XXX ALUMINUM ALLOYS FOR ADHESIVE BONDING

CROSS-REFERENCE TO RELATED APPLICATIONS

This application is a continuation of International Patent Application No. PCT/US2018/039789, filed Jun. 27, 2018, which claims priority to U.S. Patent Application No. 62/526,247, filed Jun. 28, 2017, each of which is incorporated herein by reference in its entirety.

BACKGROUND

7xxx aluminum alloys are aluminum alloys having zinc and magnesium as their primary alloying ingredients, besides aluminum. It would be useful to facilitate adhesive bonding of 7xxx aluminum alloys to itself and other materials (e.g., for automotive applications).

SUMMARY

Broadly, the present disclosure relates to methods of preparing magnesium-containing aluminum alloys (e.g., having 0.2-6 wt. % Mg) for adhesive bonding, and products made by such methods. To illustrate the inventive aspects of the present method, 7xxx aluminum alloys (e.g., AlZnMg or AlZnMgCu alloys) are generally used below. However, any suitable magnesium-containing aluminum alloy may be employed with the present method.

In one approach, and referring now to FIGS. 1-5, a method (300) may comprise receiving (302) a 7xxx aluminum alloy product (100) having a 7xxx aluminum alloy matrix (106) with a surface oxide layer (102) thereon. The surface oxide layer (102) may include an aluminum oxide (e.g., AlO) sublayer (108) and a magnesium oxide (e.g., MgO) sublayer (110). The as-received surface oxide layer (102) generally has an as-received thickness (104), generally from 5 nm to 60 nm thick, depending on temper. Products shipped in the W-temper or T-temper may have a thicker as-received thickness (e.g., from about 20 to 60 nm), whereas F-temper products may have a thinner as-received oxide thickness (e.g., from about 5 to 20 nm). While the as-received surface oxide layer (102) is illustrated as being generally uniform, the as-received surface oxide layer generally has a non-uniform topography. The as-received aluminum alloy product (100) may include intermetallic particles (114) (e.g., second phase particles) at least proximal the surface oxide layer (102) (only one intermetallic particle is shown in FIG. 1). The intermetallic particles (114) may include Cu-bearing intermetallic particles, for instance. A mixed oxide layer (112) overlies at least some of the intermetallic particles (114) and may include a mixture of magnesium oxides and aluminum oxides.

After receipt (302), at least some of the intermetallic particles (114) are ablated (304), resulting in an ablated 7xxx aluminum alloy product (200) having an ablated portion (202) surrounded by an unablated portion (216). The ablating step (304) may be controlled (530) so that there is an absence of melting of the matrix (106). The ablating step (304) may also include directing (504) an energy source at the surface oxide layer (102), thereby ablating (304) at least some of the intermetallic particles (114) (e.g., by controlling (530) the energy source's radiation conditions).

In one embodiment, the receiving step (302) may also include a preparing step (410). The preparing step (410) may include a cleaning step (412) including contacting (e.g., wiping) the as-received 7xxx aluminum alloy product (100) with a proper solvent (e.g., an organic solvent, such as acetone or hexane). This cleaning step (412) facilitates removal of debris (e.g., lubricant(s), oil(s), dirt), and other items on the surface of the as-received 7xxx aluminum alloy product that might disrupt the subsequent ablating step (304).

The preparing step (410) may also include a positioning step (418). The positioning step (418) may include positioning the energy source (e.g., the laser (116)) above the surface oxide layer (102) of the as-received 7xxx aluminum alloy product (100) for the subsequent ablating step (304). In one embodiment, the laser (116) may include mounting hardware for fitting of the optics of the laser (116) to robotic equipment (218) for process automation purposes. In this embodiment, the positioning step (418) may also include positioning the laser (116) above the surface oxide layer (102) using the robot equipment (218). In another embodiment, the positioning step (418) may further include positioning the as-received 7xxx aluminum alloy product (100) beneath the energy source (e.g., the laser (116)) either instead of, or in addition to, positioning the energy source above the surface oxide layer (102). For example, and without limitation, methods (300), (400) and (500) may be performed, at least in part, as an automated process by which the as-received 7xxx aluminum alloy product (100) (e.g., a sheet product) proceeds continuously through the receiving (302) and ablating (304) steps and any intervening steps.

In one embodiment, the ablating step (302) may also include directing (504) a pulsed laser beam (208) of, for example, a Q-switched, diode-pumped, solid-state (e.g., Nd:YAG) laser (116). In one embodiment, the pulsed laser (116) may operate at an average power of 300 W and the pulsed laser (116) may be capable of directing (504) at the surface oxide layer (102) laser beam (208) pulses of up to 50 mm wide, up to 0.89 mm in diameter, from a 6-10 inch focal distance, and with a maximum power of 230 kW per pulse (e.g., at a focal point proximal the surface oxide layer (102)). Other lasers and/or laser parameters may be used. One or more pulsed laser (116) types may be tuned (e.g., during the controlling step (530)) to achieve the desired effect during a directing step (504), as described below. In one embodiment, the pulsed laser (116) may direct (504) at the surface oxide layer (102) laser beam (208) pulses at a pulse frequency of from 15-40 kHz, corresponding to a period of from 25 to 67 is. In another embodiment, the pulsed laser (116) may direct (504) at the surface oxide layer (102) laser beam (208) pulses at a pulse frequency of 25 kHz, corresponding to a period of 40 is. In one embodiment, the pulsed laser (116) may direct (504) at the surface oxide layer (102) laser beam (208) pulses at a pulse duration of from 80 to 200 ns.

The ablating step (304) may further include directing (504) the energy source (e.g., the laser (116)) at the surface oxide layer (102) to volatilize (502) at least some of the intermetallic particles (114) into a vapor (206), thereby creating a displaced/ruptured mixed oxide layer (212) and a plurality of ablation voids (214) (e.g., ablation pits) proximal the surface oxide layer (102). The directing step (504) may also include volatilizing (502) the intermetallic particles (114) by controlling (530) the energy source's radiation conditions. The controlling step (530) may further include determining and controlling operational parameters and/or settings of the laser (116) to achieve the desired volatilizing (502) of the intermetallic particles (114) by inducing, for example, the requisite heating conditions (e.g., temperatures and/or heating rates) of the intermetallic particles (114) proximal the surface oxide layer (102). These operational settings and/or parameters of the laser (116) may include at least one of scan speed (e.g., feet per second), pulse frequency, pulse duration, average power, peak pulse power, beam width, beam diameter, hatch spacing (distance between scans) and focal distance to the surface oxide layer (102).

In one embodiment, the directing step (504) and/or the volatilizing step (502) may include partially ablating (304) and/or partially volatilizing (502) the mass of one or more of the intermetallic particles (114) (e.g., in the case of intermetallic particles (114) having size(s) that are considerably larger than other intermetallic particles (114)) of the as-received 7xxx aluminum alloy product (100). In another embodiment, the directing step (504) and/or the volatilizing step (502) may include fully ablating (304) and/or fully volatilizing (502) the entirety of the mass of one or more of the intermetallic particles (114). In yet another embodiment, the directing step (504) and/or the volatilizing step (502) may include fully ablating (304) and/or fully volatilizing (502) the mass of all intermetallic particles (114) subject to energy absorption from the energy source (e.g., laser (116)). The directing step (504) and/or the volatilizing step (502) may also include displacing/rupturing (506) at least a portion the mixed oxide layer (112) overlying of at least some of the intermetallic particles (114), thereby exposing the ablation voids (214) to an exterior (220) of the ablated 7xxx aluminum alloy product (200).

The ablating step (304) may further include a removing step (522). The removing step (522) may include transporting the vapor (206), particulate matter, debris, and/or other by-products of the ablating step (304) distal the ablated (202) and/or unablated (216) portions of the ablated 7xxx aluminum alloy product (200). These by-products may arise as a result of effects of the laser (116) treatment on the surface oxide layer (102), the intermetallic particles (114) and/or the mixed oxide layer (112). In one embodiment, the removing step (522) may include a vacuuming step (524). The vacuuming step (524) may include vacuuming up the by-products of the ablating step (304) using a vacuum pump (222) positioned proximal the laser (116), for instance.

In another embodiment, the removing step (522) may include a blowing step (526). The blowing step (526) may include positioning a blower (224), for example, proximal the laser (116) to blow (526) air, nitrogen or another gas toward the ablated (202) and/or unablated (216) portions to facilitate transporting the by-products of the ablating step (304) distal the ablated (202) and/or unablated (216) portions of the ablated 7xxx aluminum alloy product (200). For the removing step (522), the blowing step (526) may be performed either instead of, or in addition to, the vacuuming step (524).

In one embodiment, the removing step (522) may be performed contemporaneously with the directing step (504). In another embodiment, the removing step (522) may be performed after the directing step (504), either instead of, or in addition to being performed contemporaneously with the directing step (504). In yet another embodiment, the removing step (522) may be performed by rinsing the ablated 7xxx aluminum alloy product (200) with water (e.g., deionized water) and/or other suitable cleaning/rinsing agents, either instead of, or in addition to, performing the vacuuming (524) and/or blowing (526) steps.

In one embodiment, the surface oxide layer (102) of the as-received 7xxx aluminum alloy product may include the aluminum oxide sublayer (108) overlying the matrix (106). In another embodiment, the surface oxide layer (102) may also include the magnesium oxide sublayer (110) overlying the aluminum oxide sublayer (108). The ablating step (304) may also include maintaining (508) the surface oxide layer (102) at the as-received thickness (104). In one embodiment, the ablating step (304) may result in an ablated thickness (204) of the surface oxide layer (102) remaining, at least on average, substantially equal to the as-received thickness (104). In another embodiment, the ablating step (304) may result in the ablated thickness (204) of the surface oxide layer (102) being decreased as compared to the as-received thickness (104). In one embodiment, the ablated thickness (204) of the surface oxide layer (102) is from about 5 to 60 nm. In another embodiment, the ablated thickness (204) of the surface oxide layer (102) is from about 20 to 60 nm (e.g., an ablated 7xxx aluminum alloy product (200) in the W-, F- or T-temper). In yet another embodiment, the ablated thickness (204) of the surface oxide layer (102) is from about 5 to 20 nm (e.g., an ablated 7xxx aluminum alloy product (200) in the F-temper). In another embodiment, the ablated thickness (204) of the surface oxide layer (102) is <200 nm.

The ablating step (304) may also include preserving (528) an overall composition/concentration of at least one of the constituent elements of the surface oxide layer (102) at an as-received elemental composition. The preserving step (528) may include preserving (528) an Mg composition of the surface oxide layer (102) at an as-received Mg composition (e.g., of the magnesium oxide sublayer (110)). In one embodiment, the ablating step (304) may result in an ablated Mg composition of the surface oxide layer (102) being preserved (528), at least on average, substantially equal to the as-received Mg composition of the surface oxide layer (102). In another embodiment, the ablated Mg composition of the surface oxide layer (102) is preserved (528) at a value close to that of the as-received 7xxx aluminum alloy product (100) (e.g., typically in a range of from 20 to 45 atomic % Mg).

In one embodiment, the ablated Mg composition of the surface oxide layer (102) is preserved (528) at >10 atomic % Mg. In another embodiment, the ablated Mg composition of the surface oxide layer (102) the ablated Mg composition of the surface oxide layer (102) is preserved (528) at >12 atomic % Mg. In yet another embodiment, the ablated Mg composition of the surface oxide layer (102) is preserved (528) at >14 atomic % Mg. In another embodiment, the ablated Mg composition of the surface oxide layer (102) is preserved (528) at >16 atomic % Mg. In yet another embodiment, the ablated Mg composition of the surface oxide layer (102) is preserved (528) at >18 atomic % Mg. In another embodiment, the ablated Mg composition of the surface oxide layer (102) is preserved (528) at >20 atomic % Mg.

The ablating step (304) may further include ablating (204) at least some of the intermetallic particles (114) in the absence of melting of the matrix (106) of the ablated 7xxx aluminum alloy product (200). In one embodiment, an interface (118) may be present between the matrix (106) and the surface oxide layer (102). The matrix (206) may be an aluminum alloy metal proximal the interface (118), and may also be generally more reflective to the radiation of the energy source (e.g., laser beam (206) of the laser (116)) as compared to the intermetallic particles (114). The intermetallic particles (114), by contrast, may be less reflective to the radiation of the energy source, and thus may absorb more energy from the radiation (e.g., laser beam (206) of the laser (116)) as compared to the interface (118). The surface oxide layer (102) may be more transparent to the energy source radiation as compared to the intermetallic particles (114) and the matrix (106).

The ablating step (304) may also include selectively ablating (534) at least some of the intermetallic particles (114). The selectively ablating step (534) may exploit a determination (432) of differing properties, elemental compositions and/or physical/chemical behaviors (e.g., relative thermal conductivities, relative thermal expansion, achievable peak temperatures, induced heating rates and/or subsequent cooling rates during and/or after exposure to the radiation of the energy source) of the surface oxide layer (102), the intermetallic particles (114), and the matrix (206) proximal the interface (118). In one embodiment, the determining step (432) may be performed prior to the receiving (302) and ablating (304) steps. In another embodiment, the determining step (432) may be performed after the receiving step (302) and before the ablating step (304). The determining (432) and/or the controlling (530) steps may thereby facilitate selectively ablating (534) at least some of the intermetallic particles (114) and in the absence of melting of the matrix (206).

The ablating step (304) may further include selectively ablating (534) at least some of the intermetallic particles (114) in the absence of inducing alterations, at least on average, in a surface grain structure of the matrix (106) (e.g., the unablated portion (216)) of the ablated (200) versus the as-received (100) 7xxx aluminum alloy product. The determining (432) and/or the controlling (530) steps may also thereby facilitate selectively ablating (534) at least some of the intermetallic particles (114) and in the absence of inducing appreciable alterations in the overall grain structure of the unablated portion (216).

The ablating step (304) may further include selectively ablating (534) at least some of the intermetallic particles (114) in the absence of inducing changes, at least on average, in an overall roughness of the surface (e.g., the unablated portion (216)) of the ablated (200) versus the as-received (100) 7xxx aluminum alloy product. The determining (432) and/or the controlling (530) steps may also thereby facilitate selectively ablating (534) at least some of the intermetallic particles (114) and in the absence of inducing appreciable changes in the overall roughness of the unablated portion (216).

The method (500) may also include locating (536) the intermetallic particles (114) prior to selectively ablating (534) them. In one embodiment, the locating (536) step may include determining the locations of the intermetallic particles (114) proximal the interface (118) of the as-received 7xxx aluminum alloy product (100). In one embodiment, one or more analytical techniques may be employed on sample(s) of the as-received 7xxx aluminum alloy product (100) to determine, for example, an average distribution of intermetallic particles (114) proximal the interface (118). For instance, an average number of intermetallic particles (114) per unit area of the surface(s) of the as-received 7xxx aluminum alloy product (100) to be selectively ablated (534) may be determined using the one or more analytical techniques. Such determinations may then be used in the controlling step (530) by, for example, informing the selection of values of the operational parameters and/or settings of the laser (116) and/or robotic equipment (420) (e.g., scan speeds, focal point loci for the directing step (504), beam diameter, beam width, etc.) to facilitate selectively ablating (534) the located intermetallic particles (114). Analytical determinations such as an average number of intermetallic particles (114) per unit area of sample(s) of the as-received 7xxx aluminum alloy product (100) may be applied to respective values selected for the controlling step (530) for a plurality of units of as-received 7xxx aluminum alloy product (100). For example, and without limitation, the determined average number of intermetallic particles (114) per unit area may inform the selection of the one or more values of the operational parameters and/or settings of the laser (116) and/or robotic equipment (420) to be used throughout the automated and/or mass production manufacturing process.

In one embodiment, the intermetallic particles (114) may define pre-ablation volumes in the as-received 7xxx aluminum alloy product (100). The ablating step (304) may further include creating at least some of the plurality of ablation voids or ablation pits (214) having ablation void volumes that are greater than the pre-ablation volumes of the intermetallic particles (114). In one embodiment, the ratio of the ablation void volume to the pre-ablation intermetallic particle volume is >1:1. In another embodiment, the ratio of the ablation void volume to the pre-ablation volume is >2:1. In yet another embodiment, the ratio of the ablation void volume to the pre-ablation volume is >3:1. In another embodiment, the ratio of the ablation void volume to the pre-ablation volume is >4:1. In yet another embodiment, the ratio of the ablation void volume to the pre-ablation volume is >5:1. In another embodiment, the ratio of the ablation void volume to the pre-ablation volume is >6:1. In yet another embodiment, the ratio of the ablation void volume to the pre-ablation volume is >7:1. In another embodiment, the ratio of the ablation void volume to the pre-ablation volume is >8:1. In yet another embodiment, the ratio of the ablation void volume to the pre-ablation volume is >9:1. In still another embodiment, the ratio of the ablation void volume to the pre-ablation volume is >10:1.

As noted above, the ablation of copper-bearing intermetallic particles may facilitate production of 7xxx aluminum alloy products capable of successfully passing appropriate adhesive bonding tests. While not being bound by any particular theory, it is believed that laser ablation of near-surface, or at-surface, copper-bearing intermetallic particles removes such particles without allowing the copper contained therein to redeposit (e.g., by electroplating) onto the aluminum alloy surface. Prior chemical etch methods may remove copper-bearing intermetallic particles (e.g., by dissolving them), but copper ions may remain in solution with such chemical etch methods, thereby allowing the copper to redeposit on the aluminum alloy surface (e.g., by electroplating), causing copper enrichment. Copper enrichment with chemical etching may be due to the preferential oxidation/dissolution during chemical etching. Chemical etching may also lead to formation of copper particles at or near the surface and these copper particles may be detrimental to later functionalization processes. With the new method disclosed herein the intermetallic particles are volatized, generally preventing re-deposition of the copper (e.g., by plating/electroplating). Accordingly, the plurality of ablation voids (e.g., ablation pits) created by the new methods disclosed herein may leave such ablation voids generally free of copper. The absence of copper in these ablation voids may facilitate creation of functionalization layers and without the need to remove the surface oxide layer of the 7xxx aluminum alloy product. The absence of copper particles at the surface may also facilitate creation of functionalization layers and without the need to remove the surface oxide layer of the 7xxx aluminum alloy product.

The new 7xxx aluminum alloy products described herein may have one or more portions having a high ablation pit density (e.g., at least 100 ablation pits/mm$^2$). The portions having the high ablation pit density are generally those that have been exposed to an energy source (e.g., a laser). The portions that have not been exposed to an energy source (i.e., unablated) may realize a low ablation pit density (e.g., less than 100 ablation pits/mm$^2$). In one embodiment, a 7xxx aluminum alloy product comprises at least 100 ablation pits per square mm of ablated surface of the 7xxx aluminum alloy product. In another embodiment, a 7xxx aluminum alloy product comprises at least 300 ablation pits per square mm of ablated surface of the 7xxx aluminum alloy product. In yet another embodiment, a 7xxx aluminum alloy product comprises at least 600 ablation pits per square mm of ablated surface of the 7xxx aluminum alloy product. In another embodiment, a 7xxx aluminum alloy product comprises at least 900 ablation pits per square mm of ablated surface of the 7xxx aluminum alloy product. In yet another embodiment, a 7xxx aluminum alloy product comprises at least 1200 ablation pits per square mm of ablated surface of the 7xxx aluminum alloy product. In another embodiment, a 7xxx aluminum alloy product comprises at least 1500 ablation pits per square mm of ablated surface of the 7xxx aluminum alloy product. In yet another embodiment, a 7xxx aluminum alloy product comprises at least 1800 ablation pits per square mm of ablated surface of the 7xxx aluminum alloy product. In another embodiment, a 7xxx aluminum alloy product comprises at least 2000 ablation pits per square mm of ablated surface of the 7xxx aluminum alloy product. In one embodiment, the ablated surface is the outer surface (i.e., the whole surface is ablated). In another embodiment, the ablated surface is one or more ablated zones (e.g., portion(s) of a surface).

The intermetallic particles (114) of the as-received 7xxx aluminum alloy product (100) may include constituent particles and/or dispersoids, for instance. Intermetallic particles are generally at least 200 nanometers in size on average. Intermetallic particles may be positioned proximal the interface (118) of the as-received 7xxx aluminum alloy product (100). The as-received 7xxx aluminum alloy product (100) may include other intermetallic particles (114) in addition to or in lieu of Cu-bearing intermetallic particles, such as Fe-bearing, Si-bearing, and/or Mg-bearing intermetallic particles. The intermetallic particles may include, for example and without limitation, $Al_7Cu_2Fe$, $Al_2CuMg$, and $Al_{12}(Fe,Mn)_3Si$ constituted particles. At least some of the intermetallic particles (114) (e.g., those containing copper) may cause undesirable corrosion and/or adhesive bonding issues. The ablating step (304) may thus also include increasing a corrosion resistance (e.g., improving a corrosion performance) of the ablated 7xxx aluminum alloy product (200). The ablating step (304) may thus include increasing an adhesive bonding performance of the ablated 7xxx aluminum alloy product (200), as further described below. In one embodiment, the ablating (304) comprises ablating at least some of the constituent particles, but not the strengthening phases. Such strengthening phases are usually less than 200 nm in size, and often less than 100 nm in size (e.g., around 50 nm in size, on average), depending on temper. In this regard, a 7xxx series aluminum alloy may include strengthening phases such as $Mg_2Si$ and $Mg_2Zn$ precipitates, among others. A 7xxx series aluminum alloy may include constituent particles such as, $Al_7Cu_2Fe$, $Al_2CuMg$, and $Al_{12}(Fe,Mn)_3Si$, among others. Thus, for 7xxx series aluminum alloys, in one embodiment the ablating (304) may comprise ablating one or more of $Al_7Cu_2Fe$ constituent particles, $Al_2CuMg$ constituent particles, and $Al_{12}(Fe,Mn)_3Si$ constituent particles, but not ablating at least one of $Mg_2Si$ precipitates and $Mg_2Zn$ precipitates.

Referring now to FIG. 6, a method (600) may include determining (602) at least one bonding location associated with the ablated 7xxx aluminum alloy product (200). In one embodiment, determining (602) the at least one bonding location may be performed before the receiving step (302) and before the ablating step (304). In another embodiment, the determining (602) step may be performed after the receiving step (302). The ablating step (304) may also include completing (604) the ablating step (304) relative to the at least one bonding location, thereby creating the ablated portion (202). In one embodiment, the pre-determined bonding location(s) may correspond to pre-selected portion(s) (e.g., portion(s) to be subsequently bonded to another material) of the as-received 7xxx aluminum alloy product (100) to be ablated (304) during the ablating step (304). In another embodiment, only those portion(s) of the 7xxx aluminum alloy product (100 and/or 200) that are pre-selected to be adhesively bonded are ablated during the ablating step (304). An appropriate optical system may be used to facilitate locating the pre-determined location(s) for the subsequent adhesive bonding.

Referring now to FIGS. 14a-14b, a schematic, top-down view of the outer surface of a 7xxx aluminum alloy product is shown (1400). The outer surface (1400) comprises a plurality of first zones (1410a, 1410b, 1410c, and 1410d) and a second zone (1420). As depicted, the second zone (1420) has not been ablated, and is therefore absent of ablation pits. Conversely, the first zones (1410a, 1410b, 1410c, 1410d) have been ablated (e.g., exposure to an energy source), and therefore comprise a plurality of ablation pits. In this regard, FIG. 14b shows a close-up view of a portion (1430) of first zone 1410b and a portion (1440) of the second zone (1420). As shown, the portion (1430) of the first zone (1410b) comprises a plurality of ablation pits (1432). The illustrated portion (1430) of first zone 1410b is adjacent to the portion (1440) of the second zone (1420). The plurality of first zones may be located in any suitable location, and may be of any suitable size and/or shape. As such, the plurality of first zones may be arranged in any suitable configuration relative to one another, and relative to the second zone(s). For instance, the plurality of first zones may be located in any suitable location, such as on one or more of an upper surface, a lower surface, one more edges, and/or one or more corners. A first zone may also be contiguous across one or more surfaces of a 7xxx aluminum alloy product. For instance, a first zone may comprise a first portion located on an upper surface, a second portion located on an edge, and a third portion located on the lower surface, where the first, second, and third portions are contiguous with each other (i.e., they are not separated by the second zone). Thus, the plurality of first zones may be tailored according to the needs of the final product. For instance, the plurality of first zones may be associated with one or more pre-determined bonding locations.

The plurality of first zones may realize a depth generally not greater than 10 micrometers. In one embodiment, one or more first zones realize a depth of not greater than 7 micrometers. In another embodiment, one or more first zones realize a depth not greater than 5 micrometers. In yet another embodiment, one or more first zones realize a depth of not greater than 4 micrometers. The ablation pits may realize a depth that is not greater than the depth of the ablated zones. Thus, in one embodiment, a plurality of ablation pits realize an average depth that is not greater than the depth of one or more first zones.

Referring now to FIG. 15, a schematic, side-view of a 7xxx aluminum alloy product (100) is shown. The 7xxx aluminum alloy product (100) comprises an upper surface oxide layer (102), as described above, and a lower surface oxide layer (103). The lower surface oxide layer (103) is generally the same as the upper surface layer (102) prior to ablation. As depicted, the 7xxx aluminum alloy product (100) comprises an upper surface (150) and a lower surface (151). The upper surface (150) is associated with the upper surface oxide layer (102), and the lower surface (151) is associated with the lower surface oxide layer (103). As depicted, the upper surface oxide layer (102) is disposed on top of the aluminum alloy matrix (106), and the lower surface oxide layer (103) is disposed on the bottom of the aluminum alloy matrix (106). Thus, the aluminum alloy matrix (106) is disposed between the upper surface (150) and lower surface (151) and their respective surface oxide layers (102, 103). The surface oxide layers (102, 103) may have the features of the surface oxide as described in relation to FIGS. 1-2 above (e.g., MgO layer (110), AlO layer (108), intermetallic particles (114)). At least a portion of one or both of the surface oxide layers (102, 103) may be ablated. For instance, a portion of the upper surface (150) may be ablated while the lower surface (151) is unablated. Without receiving an ablation treatment, the surface may be absent of ablation pits. Thus, in one embodiment, the lower surface (151) is absent of ablation pits. Furthermore, the upper surface (150) and/or lower surface (151) may comprise one or more ablated zones. Alternatively, the entire surface (150 or 151) is ablated (i.e., the whole surface is ablated).

I. Creating the Functional Layer

A functional layer may be created on the ablated 7xxx aluminum alloy product (200) after the ablating step (304). Prior to creating the functional layer, the ablated 7xxx aluminum alloy product (200) may be further prepared, such as by rinsing the ablated 7xxx aluminum alloy product (200). This rinse may include rinsing with water (e.g., deionized water) so as to remove debris and/or residual chemical. In one embodiment, a rinsing step results in growth of additional aluminum oxides on the surface of the ablated 7xxx aluminum alloy product (200), which may nominally increase the thickness of the prepared surface oxide layer.

To create a functionalized layer, the ablated 7xxx aluminum alloy product (200) is generally exposed to an appropriate chemical, such as an acid or base. Thus, method (600) may also include a contacting step (606). The contacting step (606) may include contacting the ablated 7xxx aluminum alloy product (200) with a phosphorous-containing organic acid. In one embodiment, the contacting step (606) may include contacting the prepared 7xxx aluminum alloy product with any of the phosphorus-containing organic acids disclosed in U.S. Pat. No. 6,167,609 to Marinelli et al., which is incorporated herein by reference in its entirety. A layer of polymeric adhesive may then be applied to the functionalized layer (e.g., for joining to a metal support structure to form a vehicle assembly). The contacting step (606) may include other chemical methods, such as those using titanium with zirconium, to facilitate production of the functionalized layer.

The phosphorus-containing organic acid generally interacts with aluminum oxide in the surface oxide layer (102) to form the functionalized layer. The phosphorus-containing organic acid may be an organophosphonic acid or an organophosphinic acid. The organic acid is dissolved in water, methanol, or other suitable organic solvent, to form a solution that is applied to the ablated 7xxx aluminum alloy product (200) by spraying, immersion, roll coating, or any combination thereof, thereby creating at least one pretreated portion of the ablated 7xxx aluminum alloy product (200). The pretreated portion is then rinsed with water after the acid application step.

The contacting step (606) may also include selectively contacting (608) the ablated portion (202) with the phosphorus-containing organic acid to create the pretreated portion(s) of the ablated 7xxx aluminum alloy product (200). The selectively contacting step (608) may include a restricting step (610). The restricting step (610) may include restricting contact between the unablated portion (216) and the phosphorus-containing organic acid. In one embodiment, the restricting step (610) may include masking the unablated portion (216) to prevent contact between the phosphorus-containing acid and the unablated portion (216). In another embodiment, the restricting step (610) may include applying the phosphorus-containing organic acid as a gel formulation to facilitate contact only to the ablated portion (202).

The term "organophosphonic acid" includes acids having the formula $R_m[PO(OH)_2]_n$ wherein R is an organic group containing 1-30 carbon atoms, m is the number of organic groups and is about 1-10, and n is the number of phosphonic acid groups and is about 1-10. Some suitable organophosphonic acids include vinyl phosphonic acid, methylphosphonic acid, ethylphosphonic acid, octylphosphonic acid and styrenephosphonic acid.

The term "organophosphinic acid" includes acids having the formula $R_m R'_o[PO(OH)]_n$ wherein R is an organic group containing 1-30 carbon atoms, R' is hydrogen or an organic group containing 1-30 carbon atoms, m is the number of R groups and is about 1-10, n is the number of phosphinic acid groups and is about 1-10, and o is the number of R' groups and is about 1-10. Some suitable organophosphinic acids include phenylphosphinic acid and bis-(perfluoroheptyl) phosphinic acid.

In one embodiment, a vinyl phosphonic acid surface treatment is used that forms essentially a monolayer with aluminum oxide in the surface layer. The coating area weight may be less than about 15 mg/m$^2$. In one embodiment, the coating area weight is only about 3 mg/m$^2$.

An advantage of these phosphorus-containing organic acids is that the pretreatment solution contains less than about 1 wt. % chromium and preferably essentially no chromium. Accordingly, environmental concerns associated with chromate conversion coatings are eliminated.

In another embodiment, a functionalization layer is produced via a TiZr conversion coating, wherein, after the laser ablation (and without the need for pickling/oxide removal), applicable portion(s) of the aluminum alloy product are exposed to one or more solutions comprises titanium and zirconium. In one embodiment, no oxide removal step is required, e.g., the method is absent of a pickling step due to the laser ablation of the 7xxx aluminum alloy product. In one embodiment, a solution comprising TiZr (e.g., a hexafluoride solution) is sprayed on one or more laser ablated surfaces of the 7xxx aluminum alloy product, thereby forming the functionalization layer. In another embodiment, a laser ablated 7xxx aluminum alloy product is immersed in a solution comprising TiZr. One known TiZr solution is GARDOBOND® X4591, produced by Chemetall (675 Central Avenue, New Providence, N.J. 07974).

The functionalized ablated 7xxx aluminum alloy product (200) may then be cut in desired sizes and shapes and/or worked into a predetermined configuration. Castings, extrusions and plate may also require sizing, for example by machining, grinding or other milling process. Shaped assemblies made in accordance with the invention are suitable for many components of vehicles, including automotive bodies, body-in-white components, doors, trunk decks and hood lids.

The functionalized 7xxx aluminum alloy products may be bonded to a metal support structure using a polymeric adhesive. Thus, method (600) may further include selectively applying a bonding agent to the pretreated portion(s) of the ablated 7xxx aluminum alloy product (200). Method (600) may also thus include joining the pretreated portion(s) of the ablated 7xxx aluminum alloy product (200) to another material via the bonding agent.

Methods (300), (400), (500) and/or (600) may be implemented in a mass production process including, without limitation, automotive- and/or aerospace-related manufacturing processes. In manufacturing automotive components, for example, it is often necessary to join the functionalized 7xxx aluminum alloy material to an adjacent structural member. Joining functionalized 7xxx aluminum alloy materials may be accomplished in two steps. First, a polymeric adhesive layer may be applied to the functionalized 7xxx aluminum alloy product, after which it is pressed against or into another component (e.g., another functionalized 7xxx aluminum alloy product; a steel product; a 6xxx aluminum alloy product; a 5xxx aluminum alloy product; a carbon reinforced composite). The polymeric adhesive may be an epoxy, a polyurethane or an acrylic.

After the adhesive is applied, the components may be spot welded together, e.g., in a joint area of applied adhesive. Spot welding may increase peel strength of the assembly and may facilitate handling during the time interval before the adhesive is completely cured. If desired, curing of the adhesive may be accelerated by heating the assembly to an elevated temperature. The assembly may then be passed through a zinc phosphate bath, dried, electrocoated, and subsequently painted with an appropriate finish.

II. Aluminum Alloys

As noted above, while 7xxx aluminum alloy were used to describe various inventive aspects of the invention, the methods described herein may be used with any magnesium-containing aluminum alloy. Magnesium-containing aluminum alloys are aluminum alloys having a sufficient amount of magnesium such that the MgO layer described above may be formed. As a non-limiting example, a magnesium-containing aluminum alloy may contain from 0.2 to 6 wt. % Mg. In one embodiment, a magnesium-containing aluminum alloy contains at least 0.5 wt. % Mg. Indeed, while the disclosure has been described in relation to 7xxx aluminum alloy products and ablation of their intermetallic particles, it is anticipated that the ablation techniques described herein may also be applicable to other aluminum alloys having intermetallic particles available for ablation. Such other aluminum alloys may include one or more of 2xxx, 5xxx, 6xxx, and 8xxx (e.g., 8xxx aluminum alloys containing high amounts of iron or lithium).

The magnesium-containing aluminum alloys aluminum alloy may be in any form, such as in the form of a wrought product (e.g., a rolled sheet or plate product, an extrusion, a forging). The magnesium-containing aluminum alloys aluminum alloy product may alternatively be in the form of a shape-cast product (e.g., a die casting). The magnesium-containing aluminum alloys aluminum alloy product may alternatively be an additively manufactured product. As used herein, "additive manufacturing" means "a process of joining materials to make objects from 3D model data, usually layer upon layer, as opposed to subtractive manufacturing methodologies", as defined in ASTM F2792-12a entitled "Standard Terminology for Additively Manufacturing Technologies".

The temper and aluminum alloy definitions (2xxx, 5xxx, 6xxx, 7xxx, 8xxx) provided herein are per ANSI H35.1 (2009).

a. 7xxx Aluminum Alloys

The systems and methods disclosed herein may be applicable to 7xxx aluminum alloy products, such as those including copper resulting in the formation of copper-bearing intermetallic particles. In one approach, the 7xxx aluminum alloy product comprises 2-12 wt. % Zn, 1-3 wt. % Mg, and 1-3 wt. % Cu. In one embodiment, the 7xxx aluminum alloy product is one of a 7009, 7010, 7012, 7014, 7016, 7116, 7032, 7033, 7034, 7036, 7136, 7037, 7040, 7140, 7042, 7049, 7149, 7249, 7349, 7449, 7050, 7150, 7055, 7155, 7255, 7056, 7060, 7064, 7065, 7068, 7168, 7075, 7175, 7475, 7178, 7278, 7081, 7181, 7085, 7185, 7090, 7093, 7095, 7099, or 7199 aluminum alloy, as defined by the Aluminum Association Teal Sheets (2015). In one embodiment, the 7xxx aluminum alloy is 7075, 7175, or 7475. In one embodiment, the 7xxx aluminum alloy is 7055, 7155, or 7225. In one embodiment, the 7xxx aluminum alloy is 7065. In one embodiment, the 7xxx aluminum alloy is 7085 or 7185. In one embodiment, the 7xxx aluminum alloy is 7050 or 7150. In one embodiment, the 7xxx aluminum alloy is 7040 or 7140. In one embodiment, the 7xxx aluminum alloy is 7081 or 7181. In one embodiment, the 7xxx aluminum alloy is 7178. Prior to ablation, a 7xxx aluminum alloy product may be in any of an F-temper, a W-temper or a T-temper. Non-limiting examples of intermetallic particles that may be ablated in a 7xxx aluminum alloy product include constituent particles (e.g., insoluble phases formed during solidification), such as, for instance, $Al_7Cu_2Fe$, $Al_2CuMg$, $Al_{12}(Fe,Mn)_3Si$ and $Al_6(Fe,Mn)$ particles. Non-limiting examples of strengthening phases that may not be ablated include $Mg_2Si$ and $Mg_2Zn$ precipitates, among others, and dispersoids (e.g., particles formed during homogenization) of $Al_3Zr$, $Al_{12}Mg_2Cr$, $Al_{12}(Fe,Mn)_3Si$, and $Al_{20}Cu_2Mn_3$.

b. 6xxx Aluminum Alloys

The systems and methods disclosed herein may be applicable to 6xxx aluminum alloy products. In one approach, the 6xxx aluminum alloy product comprises 0.2-2.0 wt. % Mg, 0.2-1.5 wt. % Si, and up to 1.0 wt. % Cu. In one embodiment, the 6xxx aluminum alloy product is one of a 6111, 6013, 6022, 6x61 6082, 6014, 6016, or a 6063 aluminum alloy product, among others. Prior to ablation a 6xxx aluminum alloy product may be in any of a F-temper, W-temper, or T-temper. Non-limiting examples of intermetallic particles that may be ablated in a 6xxx aluminum alloy product include, for instance, $Al_{12}(Fe,Mn,Cr)_3Si$ and $Al_9Fe_2Si_2$, among others. Non-limiting examples of strengthening phases that may not be ablated include $Mg_2Si$ and Q phase ($Al_5Cu_2Mg_8Si_6$) precipitates, among others.

c. 5xxx Aluminum Alloys

The systems and methods disclosed herein may be applicable to 5xxx aluminum alloy products. In one approach, the 5xxx aluminum alloy product comprises 0.5-6.0 wt. % Mg. In one embodiment, the 5xxx aluminum alloy product is one of a 5754, 5182, 5052, 5050, 5083, 5086, 5154, 5252, 5254, 5454, 5456, 5457, 5652, 5657, 5349, 5005, or a 5022 aluminum alloy product, among others. Prior to ablation a 5xxx aluminum alloy product may be in any of a O-temper or H-temper. Non-limiting examples of intermetallic particles that may be ablated in a 5xxx aluminum alloy product include, for instance, $Al_{12}(Fe,Mn)_3Si$, among others.

d. 2xxx Aluminum Alloys

The systems and methods disclosed herein may be applicable to 2xxx aluminum alloy products. In one approach, the 6xxx aluminum alloy product comprises 0.5-7 wt. % Cu and 0.2-2.0 wt. % Mg. In one embodiment, the 2xxx aluminum alloy product is one of 2024, 2014, 2124, 2090, 2011, or a 2219 aluminum alloy product, among others. Prior to ablation a 2xxx aluminum alloy product may be in any of a F-temper, W-temper, or T-temper. Non-limiting examples of intermetallic particles that may be ablated in a 2xxx aluminum alloy product include, for instance, $Al_7Cu_2Fe$, $Al_2Cu$, $Al_2CuMg$, $Al_{12}(Fe,Mn)_3Si$ $Al_6(Fe,Mn)$, and $Al_{20}Cu_2Mn_3$, among others. Non-limiting examples of strengthening phases that may not be ablated include $Al_2Cu$, $Al_2CuMg$, $Al_2CuLi$, and $Al_3Li$, among others.

BRIEF DESCRIPTION OF THE FIGURES

FIGS. 8c and 8d are SEM images of the Example 1 alloy (80× and 350× magnifications, respectively) after laser treatment at 35 kHz (FIG. 8c) and 25 kHz (FIG. 8d).

FIGS. 10a and 10b are additional SEM backscatter images of the Example 1 alloy (2000× magnification), prior to laser treatment (FIG. 10a) and after laser treatment at 25 kHz (FIG. 10b).

FIG. 14a is a schematic, top-down view of the outer surface of a 7xxx aluminum alloy product.

FIG. 14b is a close-up view of a portion of a first zone from FIG. 14a that comprises a plurality of ablation pits.

DETAILED DESCRIPTION

Example 1

Figure 1:
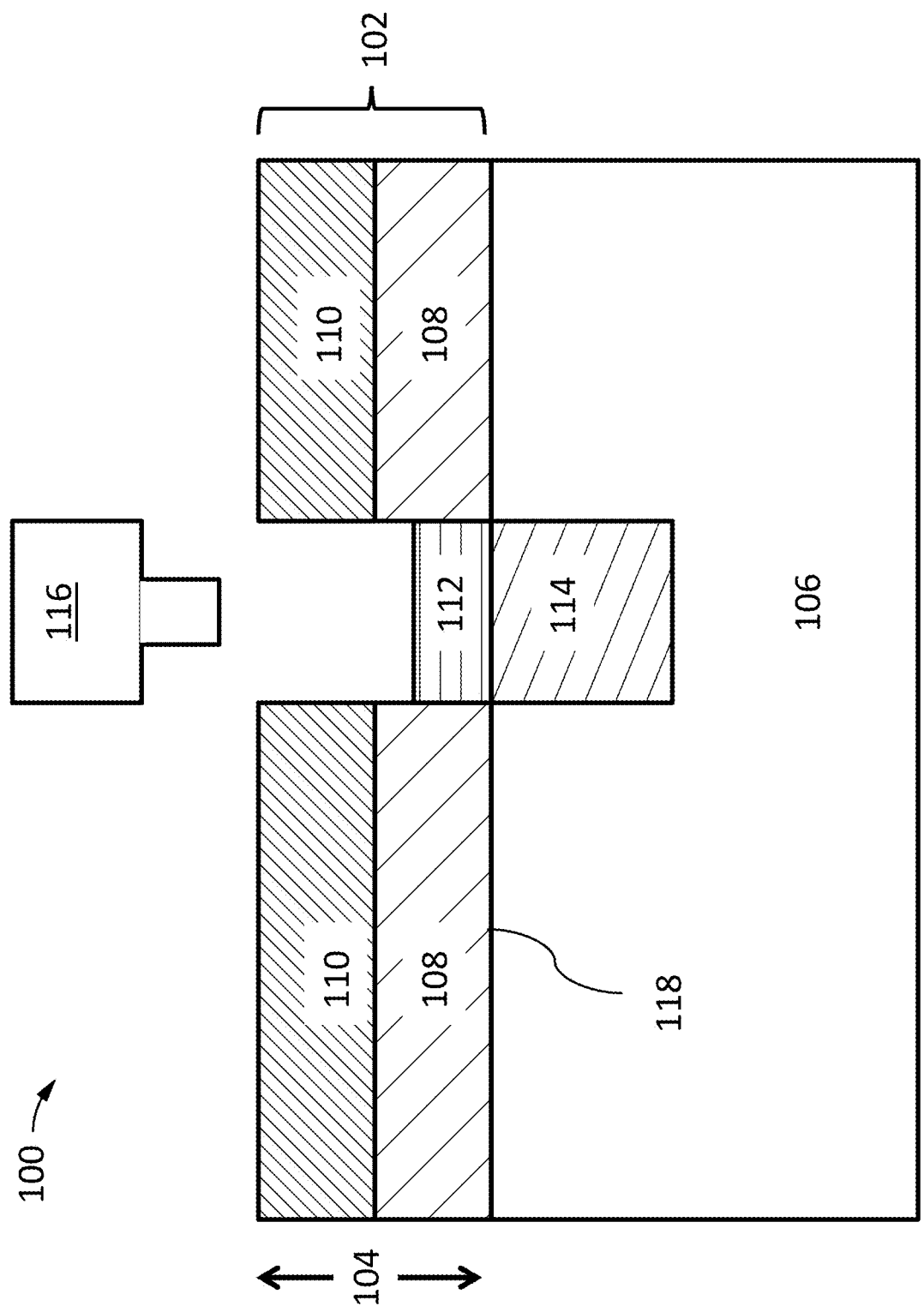
FIG. 1 is a cross-sectional schematic view of an as-received aluminum alloy product just prior to laser treatment (not to scale; for illustration purposes only).
Figure 2:
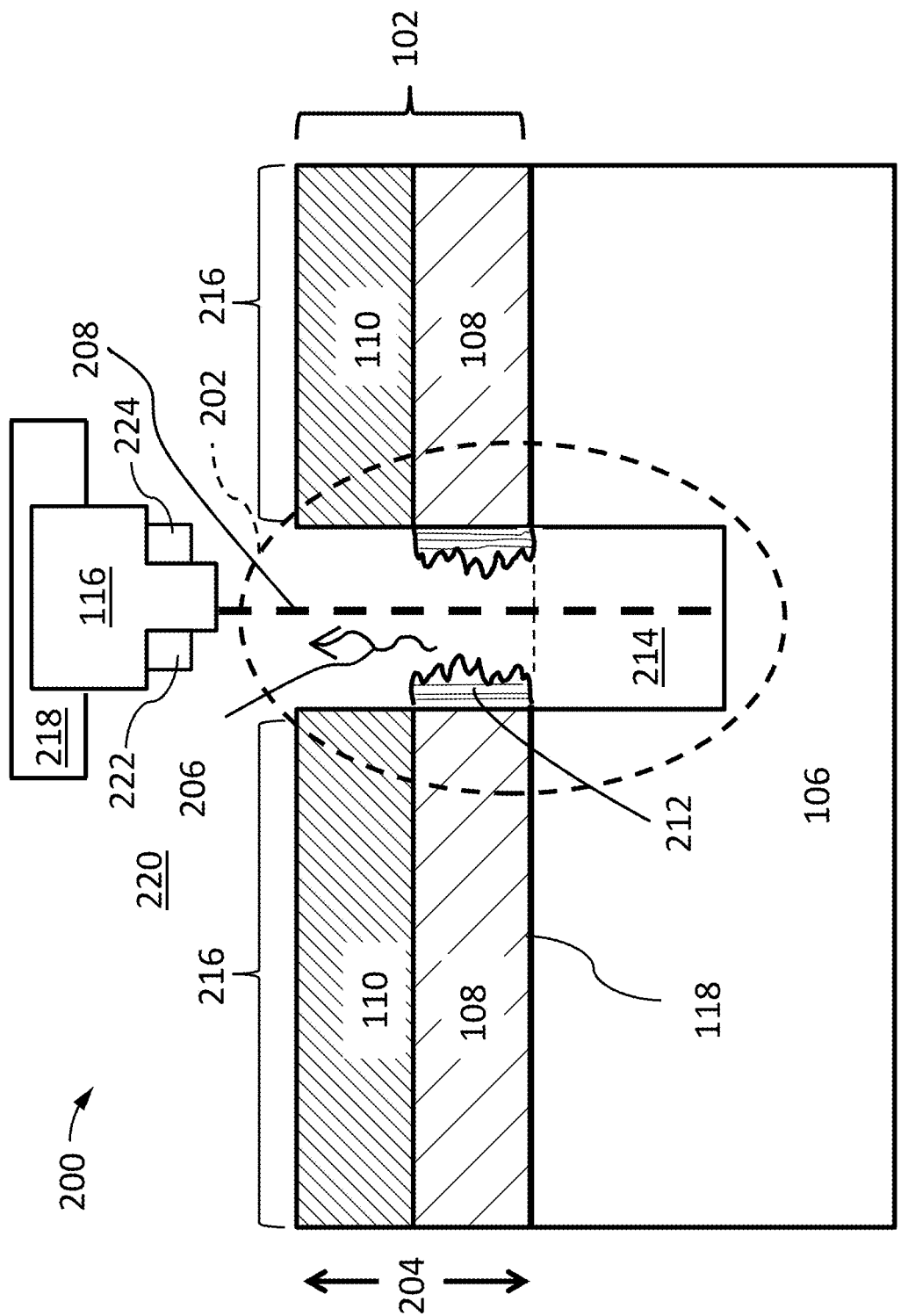
FIG. 2 is a cross-sectional schematic view of a portion of a prepared aluminum alloy product due to laser treatment (not to scale; for illustration purposes only).
Figure 3:
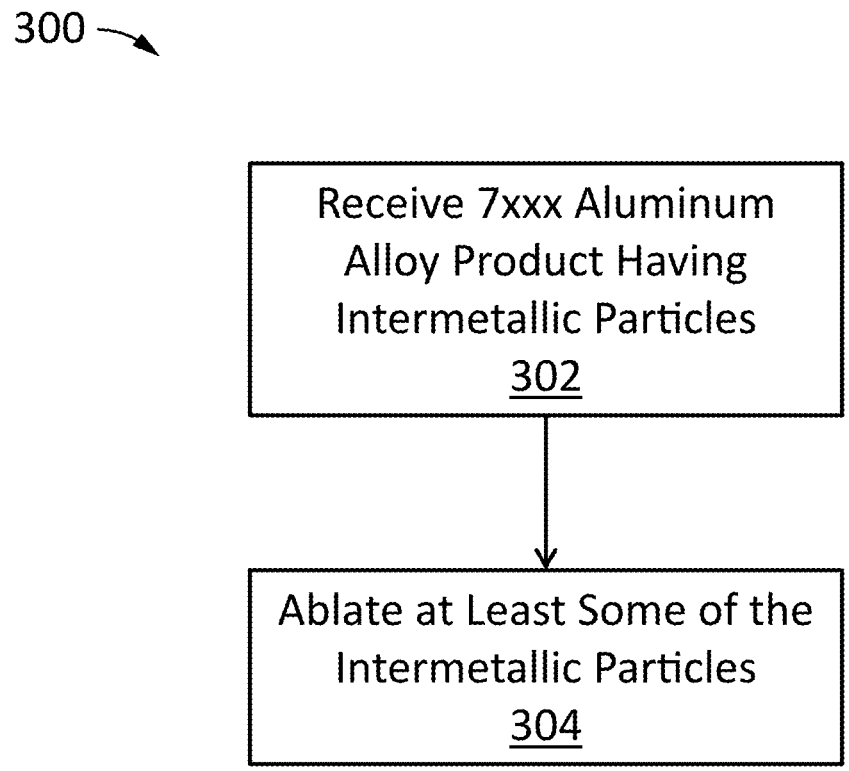
FIG. 3 is a flow chart illustrating one embodiment of a method for producing prepared aluminum alloy products in accordance with the present disclosure.
Figure 4:
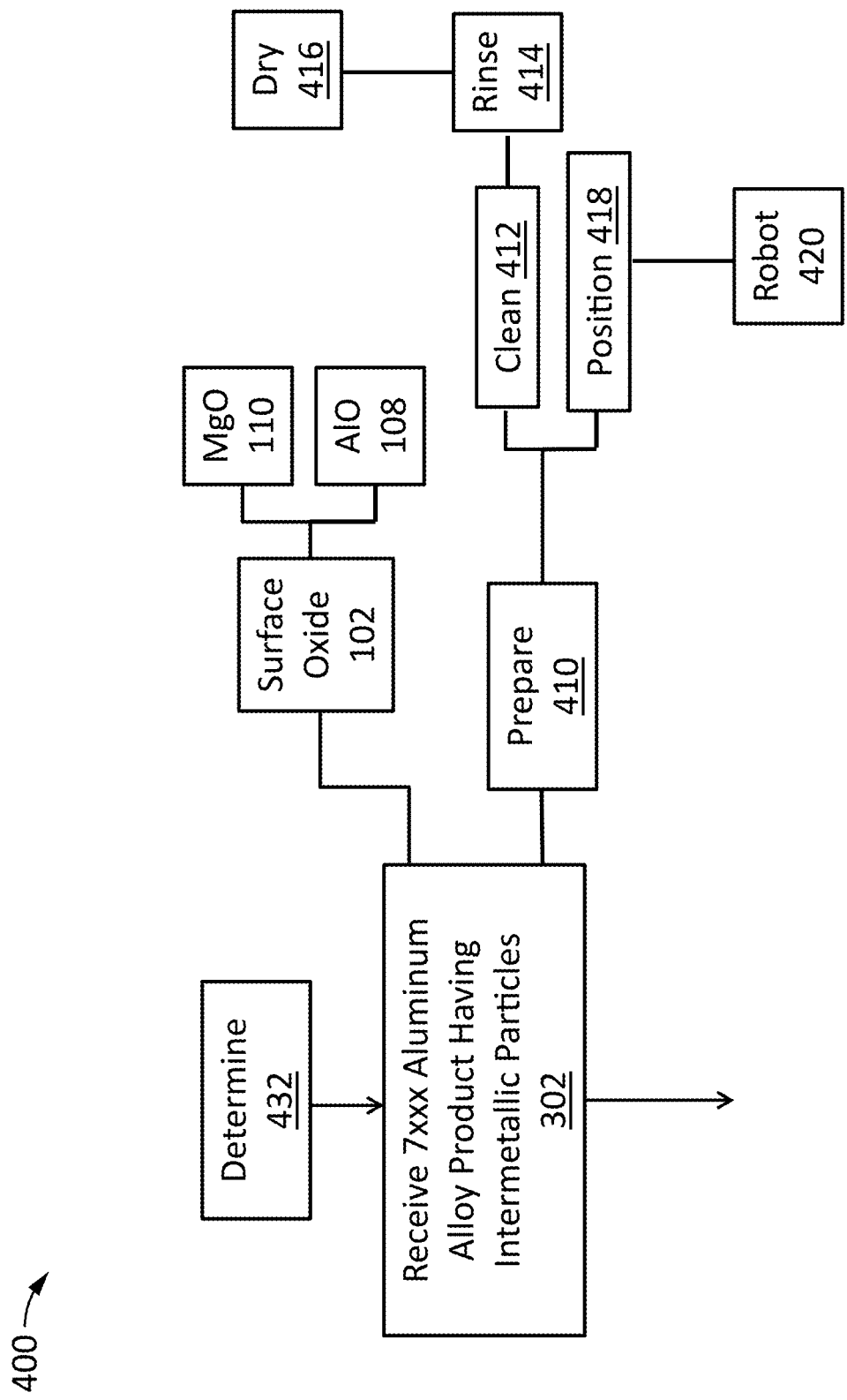
FIG. 4 is a flow chart illustrating one embodiment of the receiving step of FIG. 3.
Figure 5:
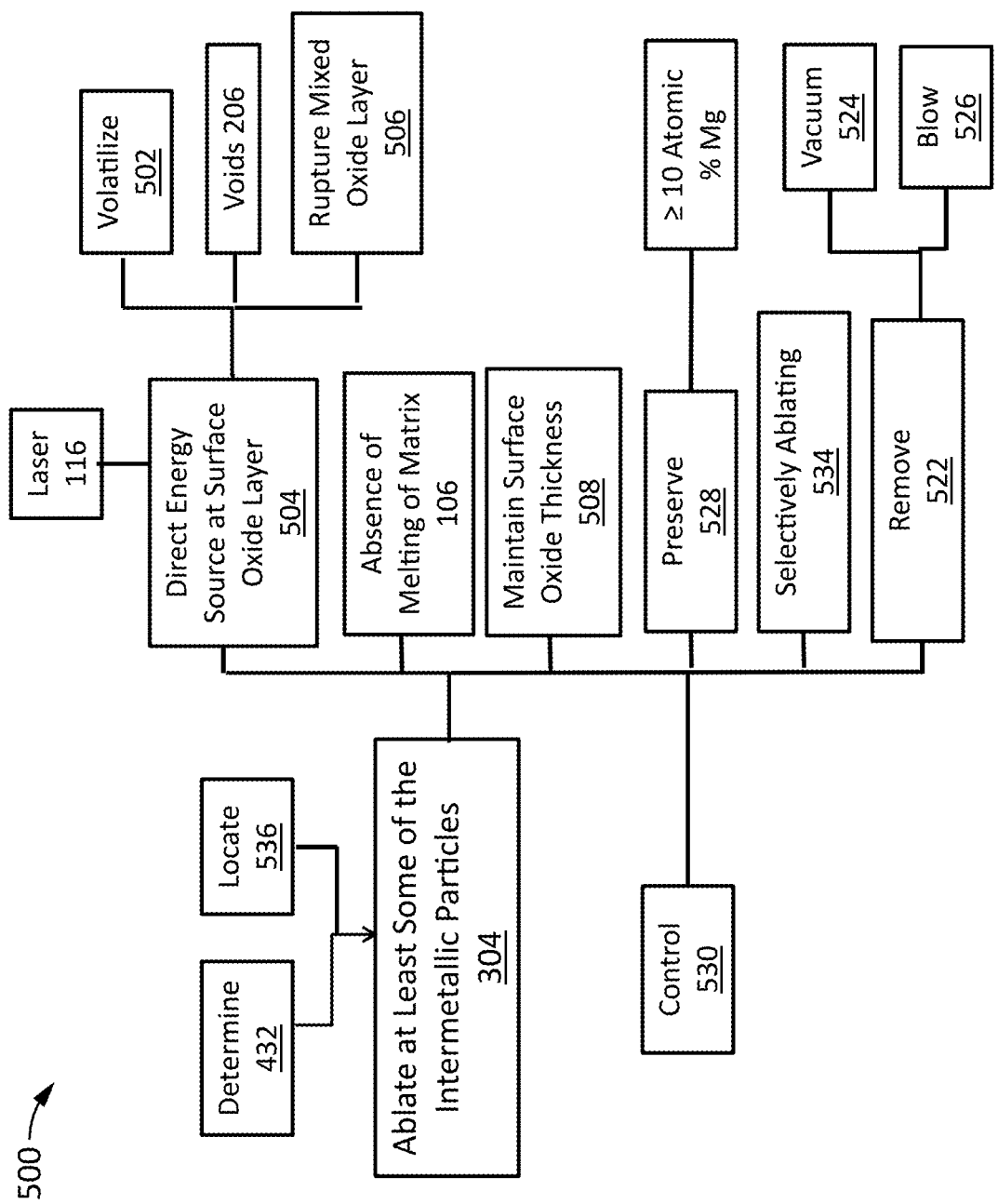
FIG. 5 is a flow chart illustrating one embodiment of the ablating step of FIG. 3.
Figure 6:
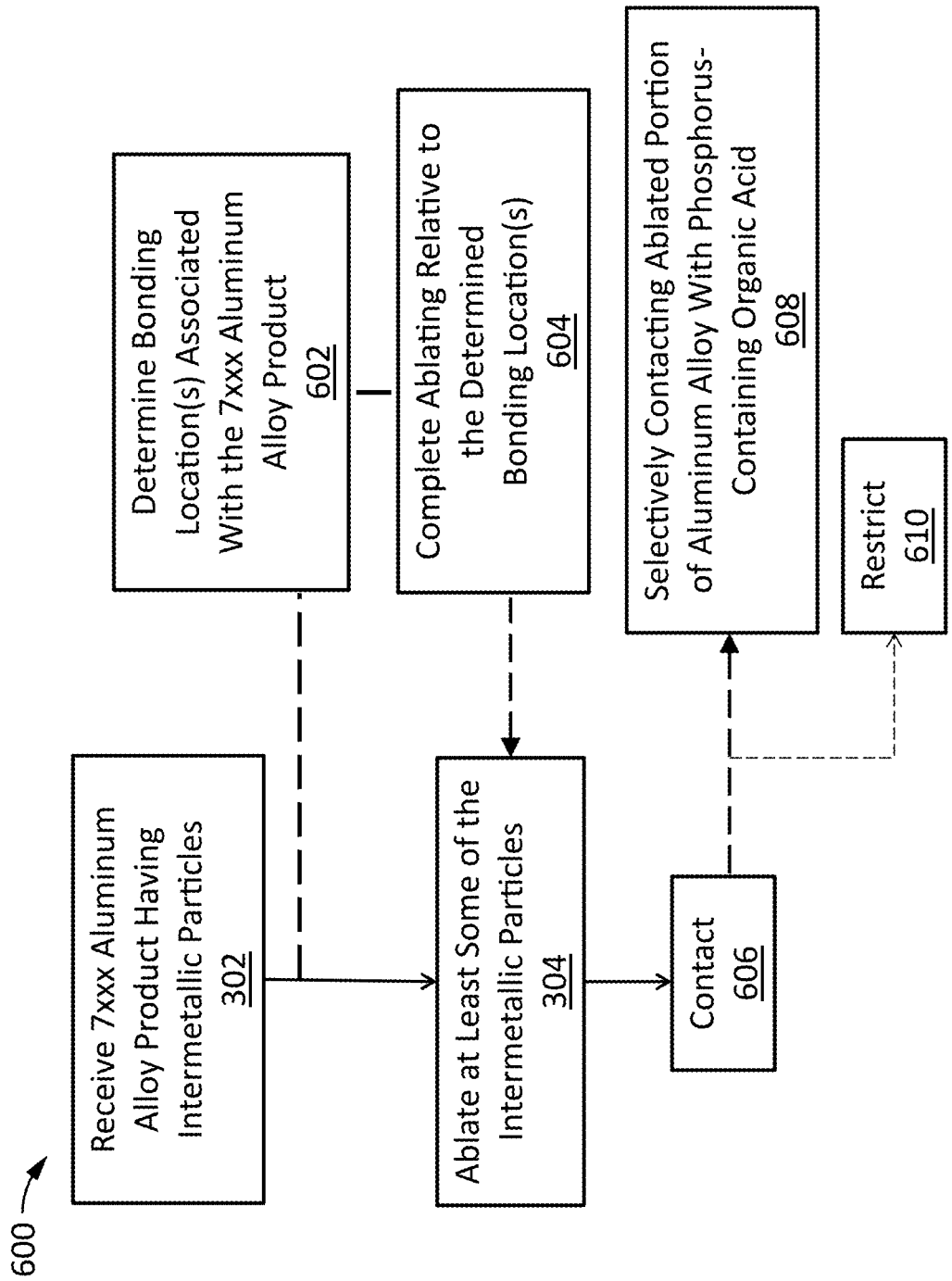
FIG. 6 is a flow chart illustrating additional embodiments of the method of FIG. 3.

A 7xxx aluminum alloy sheet product (Al—Zn—Mg—Cu type) was produced and processed to a T76 temper (per ANSI H35.1 requirements). Samples from the 7xxx aluminum alloy sheet were taken, after which the outer surfaces of the samples were cleaned with an organic solvent (e.g., hexane). The samples were then exposed to an Nd:YAG laser (Adapt Laser model CL300), which is a pulse-type laser unit having a 300 W power rating. The pulse duration used to treat the samples varied from 80 to 200 ns. A beam diameter of 390 μm was used for the treatment. Some samples were exposed to a first pulse frequency condition (1) of 35 kHz, while other samples were exposed to a second pulse frequency condition (2) of 25 kHz.

After the laser treatment, the samples were then treated with a phosphorous-containing organic acid at 150° F. for 8 seconds to produce a functionalized layer thereon. The samples were then sequentially bonded and then subjected to an industry standard cyclical corrosion exposure test, similar to ASTM D1002, which continuously exposes the samples to 1080 psi lap shear stresses to test bond durability. The results are provided in Table 1, below.

TABLE 1

| Pulse Frequency Condition | Sample Testing Results | | | |
|---|---|---|---|---|
| | Number of Cycles Completed | | | |
| | Specimen 1 | Specimen 2 | Specimen 3 | Specimen 4 |
| Cond. 1 (35 KHz) | 4 | 4 | 7 | 7 |
| Cond. 2 (25 KHz) | 45 | 34 | 45 | 45 |

As shown, none of the samples at the pulse frequency 1 condition successfully completed the 45 cycles required to pass the test. However, three of the four samples treated at the pulse frequency 2 condition successfully completed the 45 cycles required to pass the test, and the specimen that failed did so after 34 cycles, well above the number of cycles realized by the pulse frequency 1 condition samples.

Figure 7A:
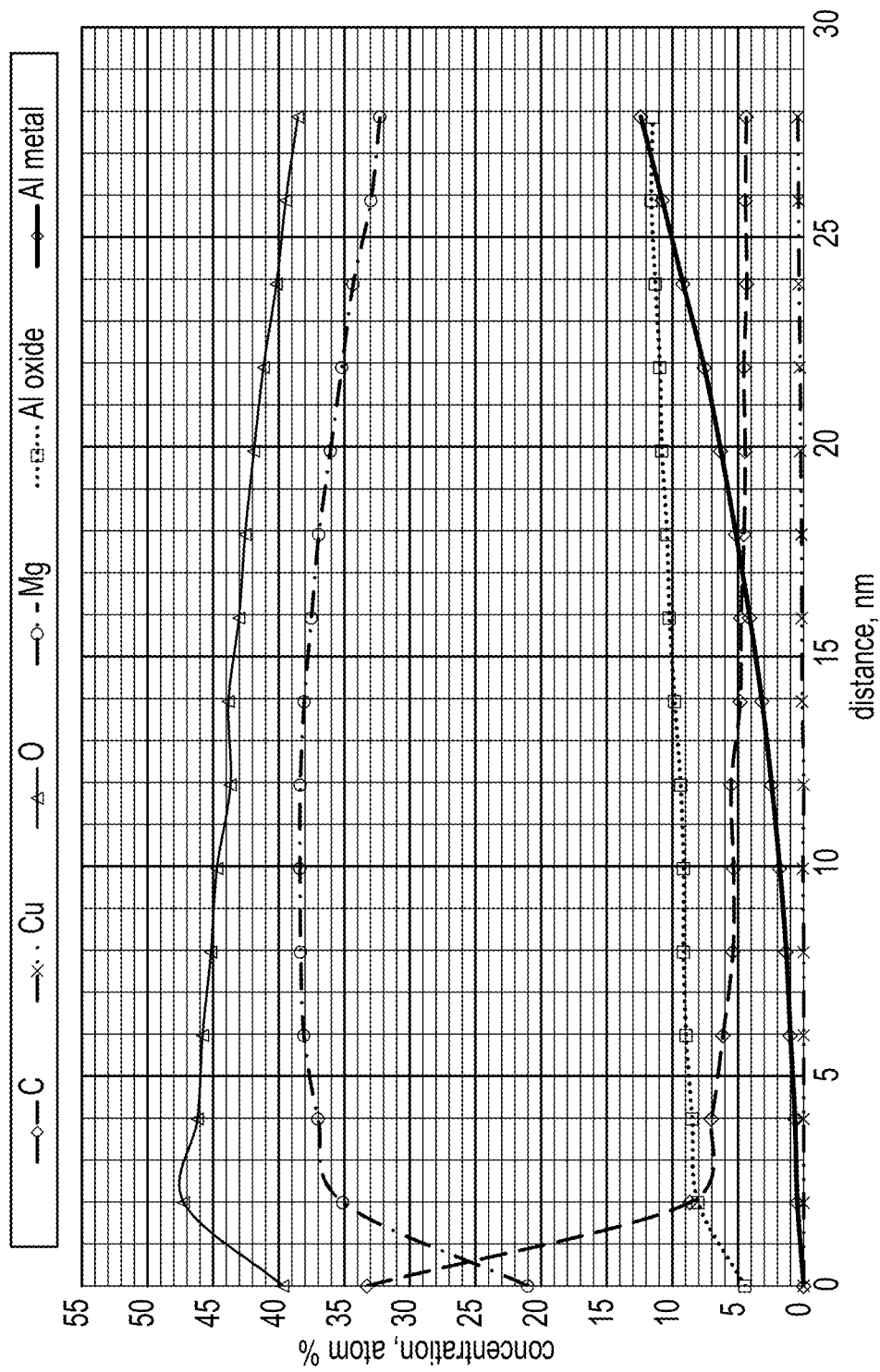
FIGS. 7a-7c are XPS graphs from Example 1 illustrating various concentrations and thicknesses of various 7xxx aluminum alloy products, the figures being as-received (FIG. 7a), laser treated at 25 kHz (FIG. 7b), and as functionalized (FIG. 7c).
Figure 7B:
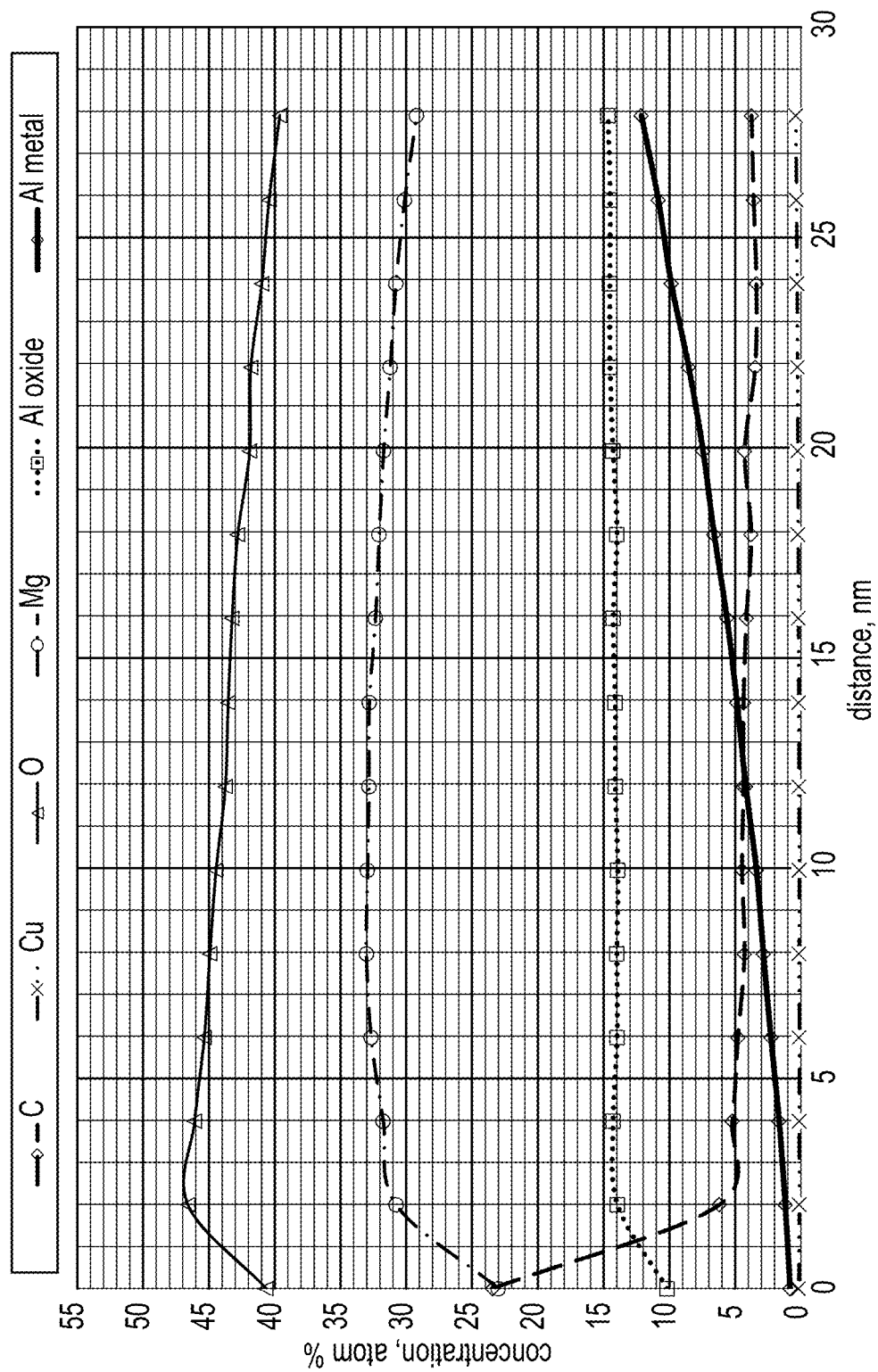
Figure 7C:
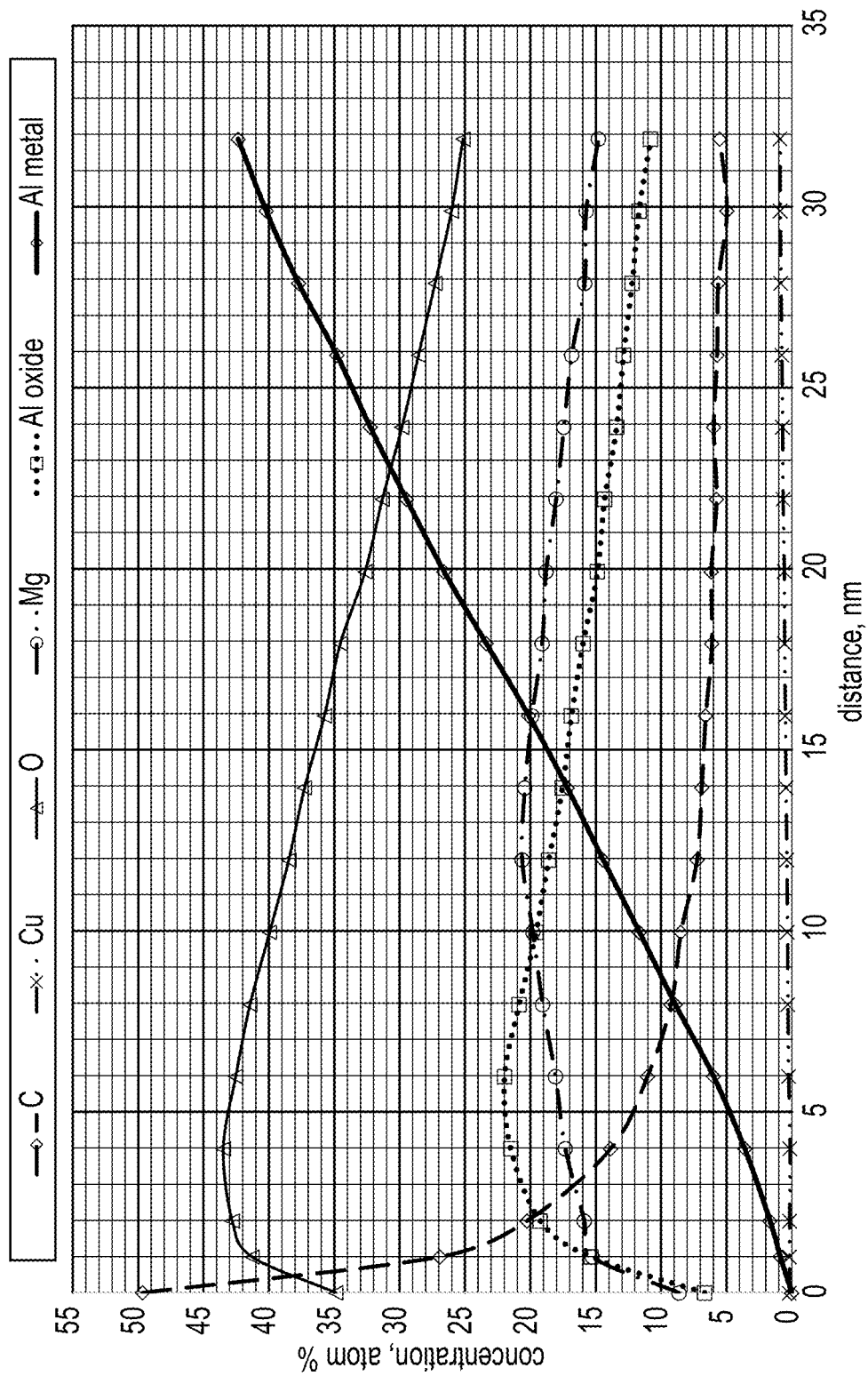

XPS (X-ray photoelectron spectroscopy) and SEM (scanning electron microscopy) were performed on some of the samples, both before and after laser treatment, as well as after functionalization by the phosphorous-containing organic acid. FIGS. 7a, 7b, and 7c are graphs plotting XPS results from a first Example 1 sample (A). FIG. 7a plots XPS results of the as-received sample A prior to laser treatment at the pulse frequency 2 condition (25 kHz), according to the protocol described above. FIG. 7b plots XPS results of sample A after laser treatment at the pulse frequency condition 2. FIG. 7c plots XPS results of sample A after its laser-treated surface was contacted with the phosphorus-containing organic acid, per the procedure described above. In each of the graphs depicted in FIGS. 7a-7c, concentrations (atom %, y-axis) of surficial constituents are plotted against distances (nm, x-axis). As shown in FIGS. 7a and 7b, the oxide layer (labeled "O") is greater than 10 nanometers (nm) thick and the concentration of Mg is greater than 10 atomic percent (%) both before and after laser treatment at condition 2, and the components of the oxide layer remain relatively unchanged.

Figure 7D:
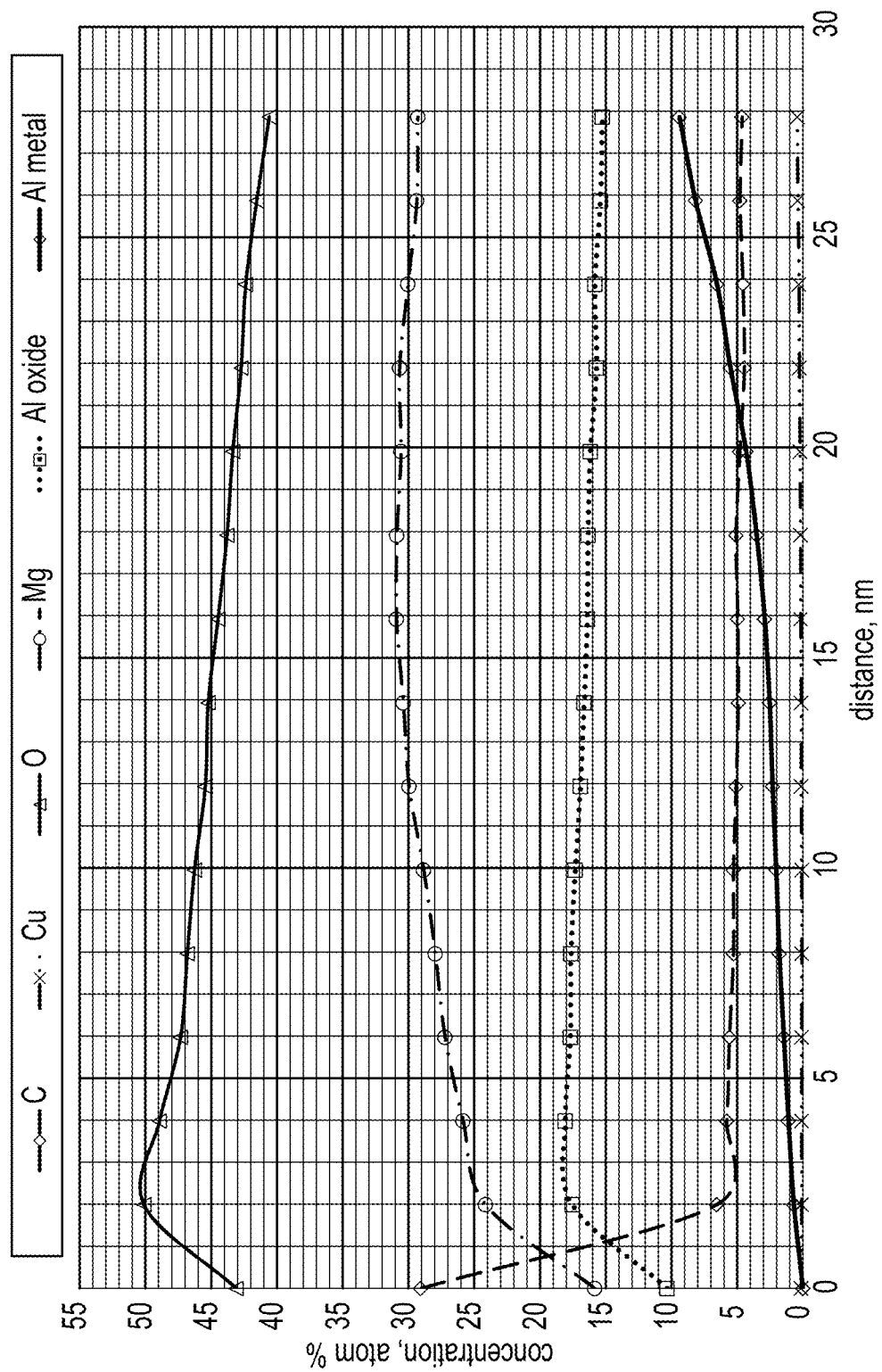
FIGS. 7d-7f are XPS graphs from Example 1 illustrating various concentrations and thicknesses of various 7xxx aluminum alloy products, the figures being as-received (FIG. 7d), laser treated at 35 kHz (FIG. 7e), and as functionalized (FIG. 7f).
Figure 7E:
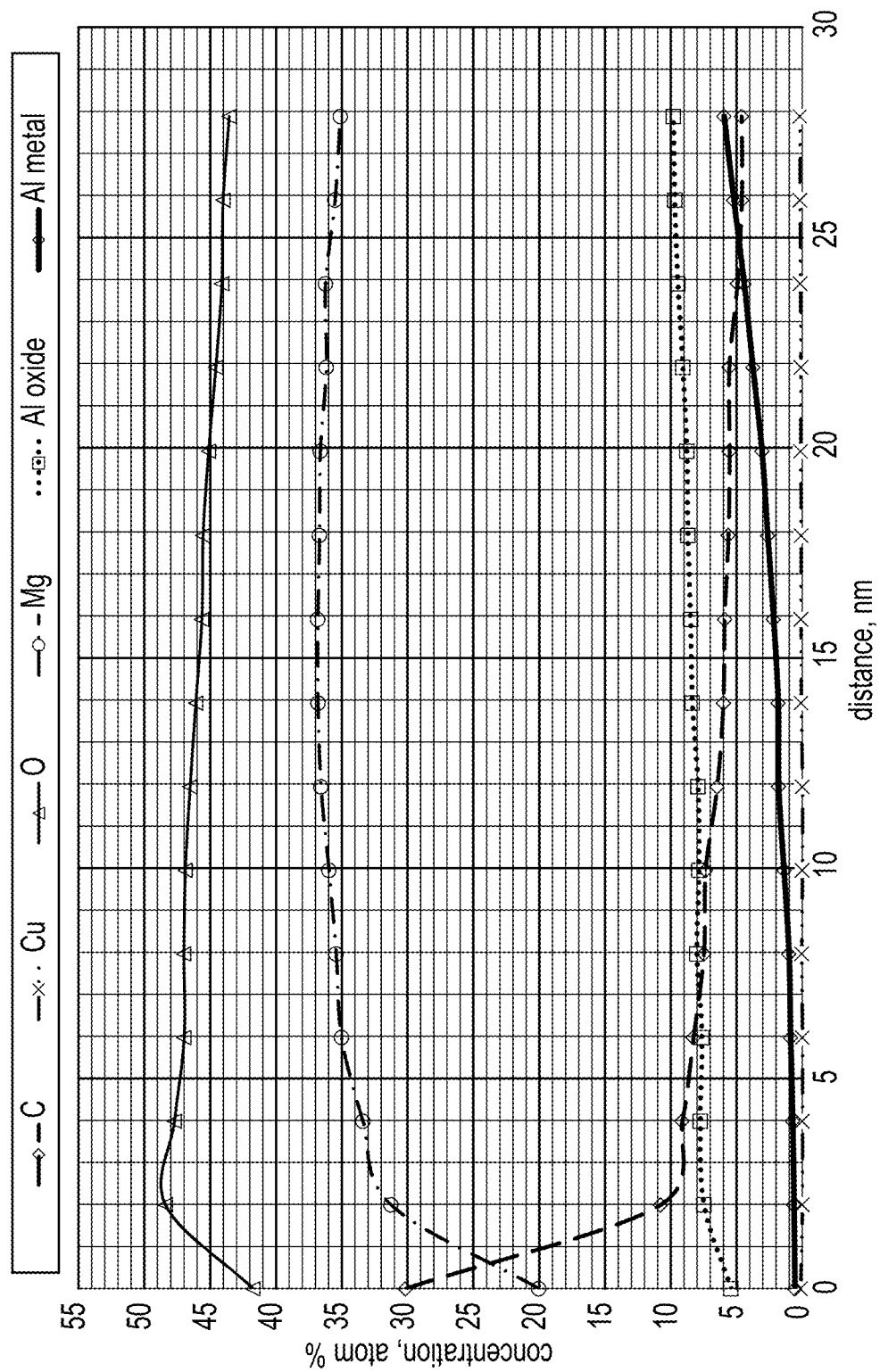
Figure 7F:
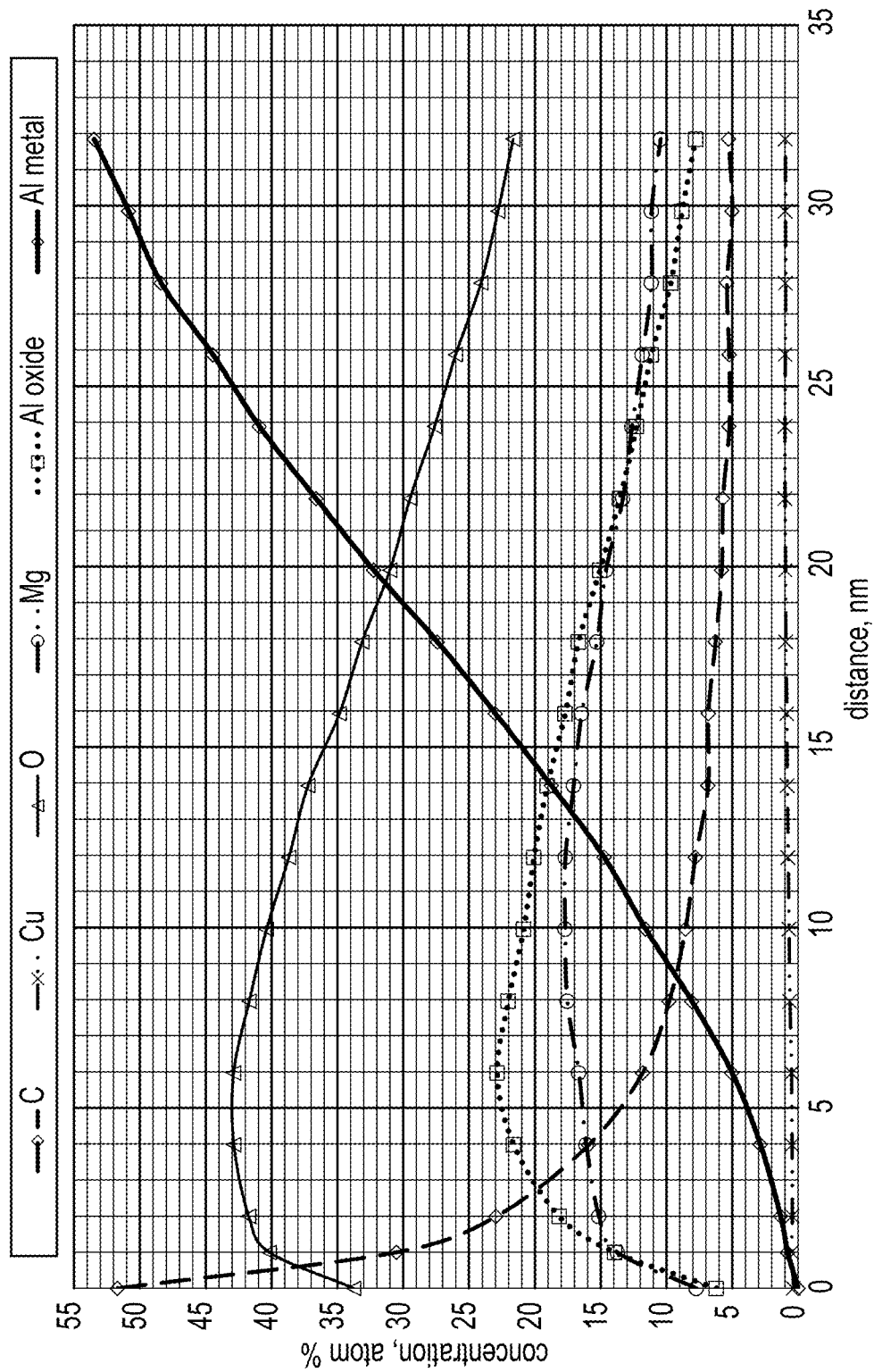

FIGS. 7d, 7e, and 7f are graphs plotting XPS results from a second Example 1 sample (B). FIG. 7d plots XPS results of the as-received sample B prior to laser treatment at the pulse frequency 1 condition (35 kHz), according to the protocol described above. FIG. 7e plots XPS results of sample B after laser treatment at pulse frequency condition 1. FIG. 7f plots XPS results of sample B after its laser-treated surface was contacted with the phosphorus-containing organic acid, per the procedure described above. In each of the graphs depicted in FIGS. 7e and 7f, concentrations (atom %, y-axis) of surficial constituents are plotted against distances (nm, x-axis). The results shown in FIGS. 7c and 7d also demonstrate that the oxide layer is greater than 10 nm thick and the concentration of Mg is greater than 10 atom % both before and after laser treatment at condition 1, and the components of the oxide layer remain relatively unchanged.

Although the XPS results of the samples treated at pulse frequency conditions 1 and 2 are substantially similar, analysis of the SEM micrographs depicted in FIGS. 8-13 shed light on the superior bond durability performance of the pulse frequency condition 2-exposed samples as compared to samples exposed to the pulse frequency condition 1. FIGS. 8a and 8b are SEM images (80× magnification) of sample A of Example 1 before and after laser treatment at pulse frequency condition 2, respectively. FIG. 8c is an SEM image (80× magnification) of sample B of Example 1 after laser treatment at pulse frequency condition 1. FIG. 8d is an SEM image (350× magnification of sample A of Example 1 after laser treatment at pulse frequency condition 2. FIGS. 9a and 9b are backscattered SEM images (80× magnification) of sample A before and after laser treatment at pulse frequency condition 2, respectively. FIG. 9c is a backscattered SEM image (80× magnification) of sample B after laser treatment at pulse frequency condition 1. FIGS. 10a and 10b are backscattered images (2000× magnification) of sample A before and after laser treatment, respectively. FIGS. 11a and 11b are backscattered images (15000× magnification) of sample A before and after laser treatment, respectively.

Figure 8B:
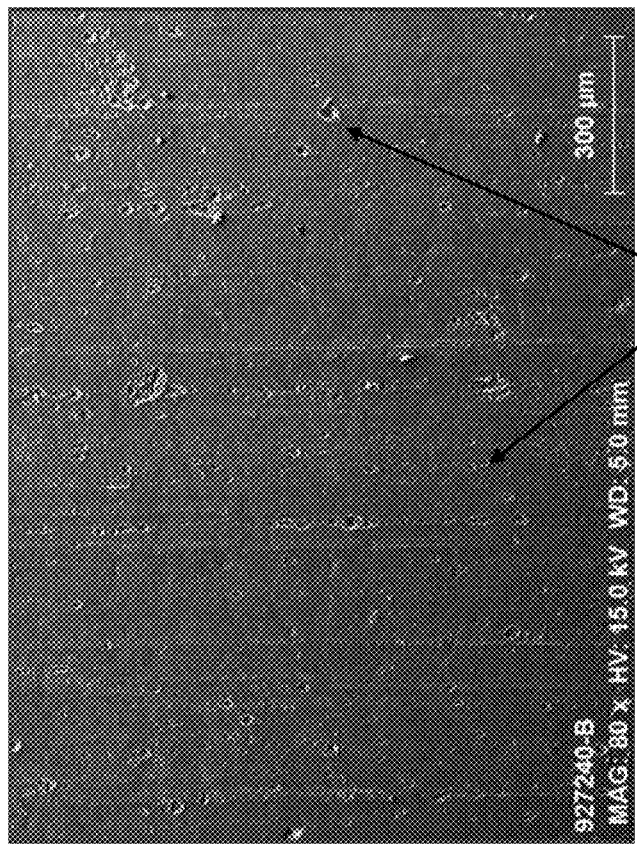
FIGS. 8a and 8b are SEM images of the Example 1 alloy (80× magnification), prior to laser treatment (FIG. 8a) and after laser treatment at 25 kHz (FIG. 8b).
Figure 8A:
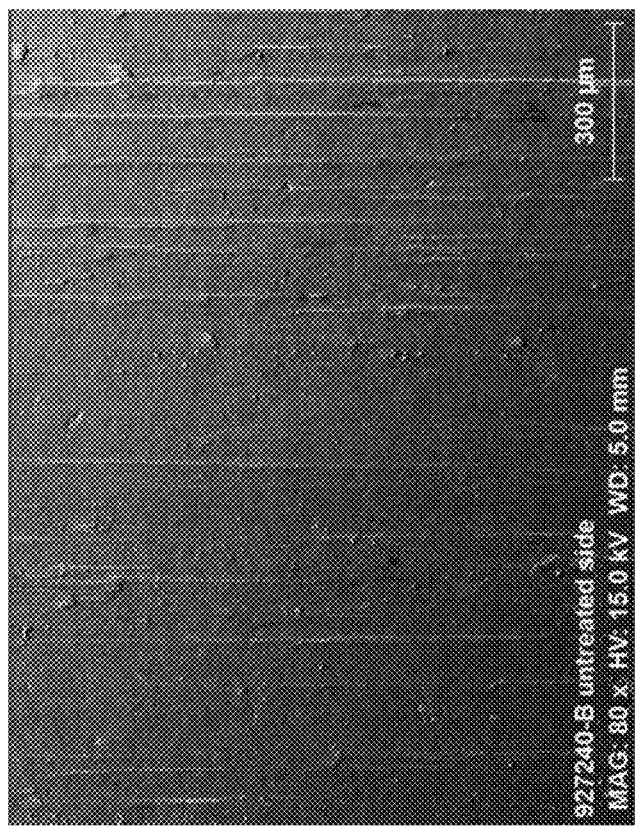
Figures 9A, 9B:
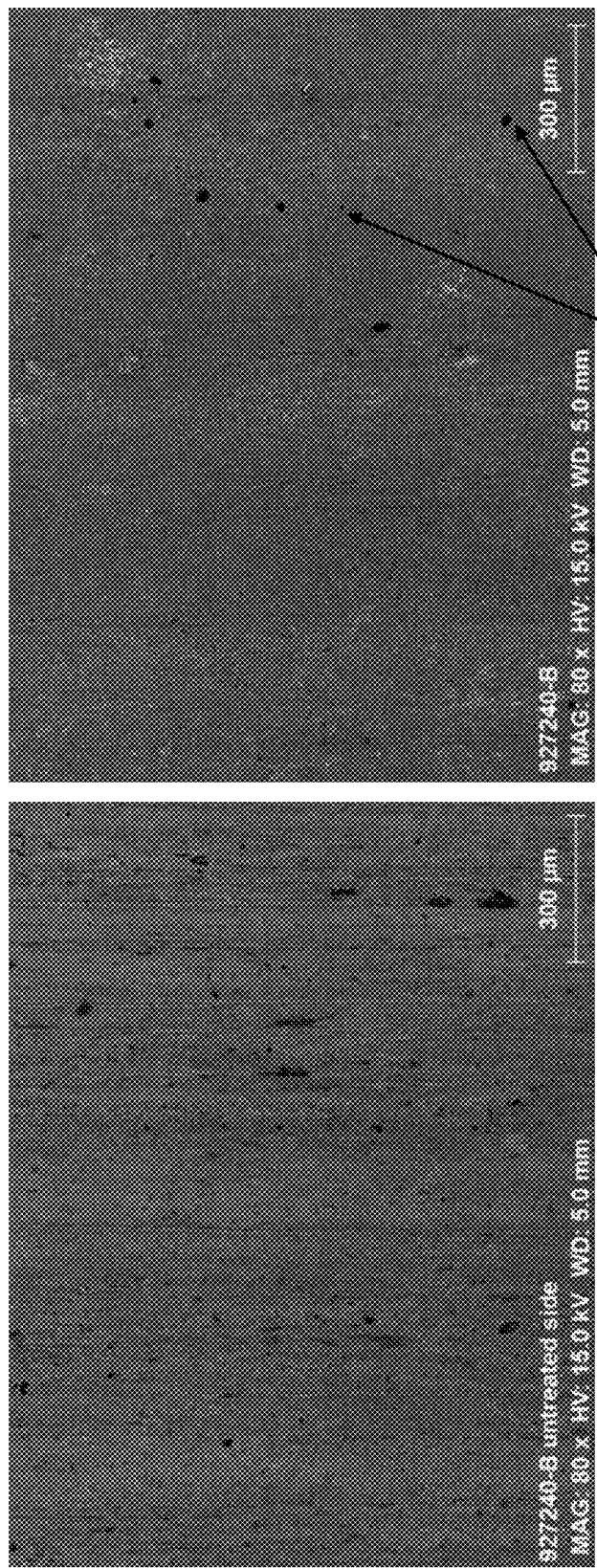
FIGS. 9a and 9b are SEM backscattered images of the Example 1 alloy (80× magnification), prior to laser treatment (FIG. 9a) and after laser treatment at 25 kHz (FIG. 9b).
Figure 9C:
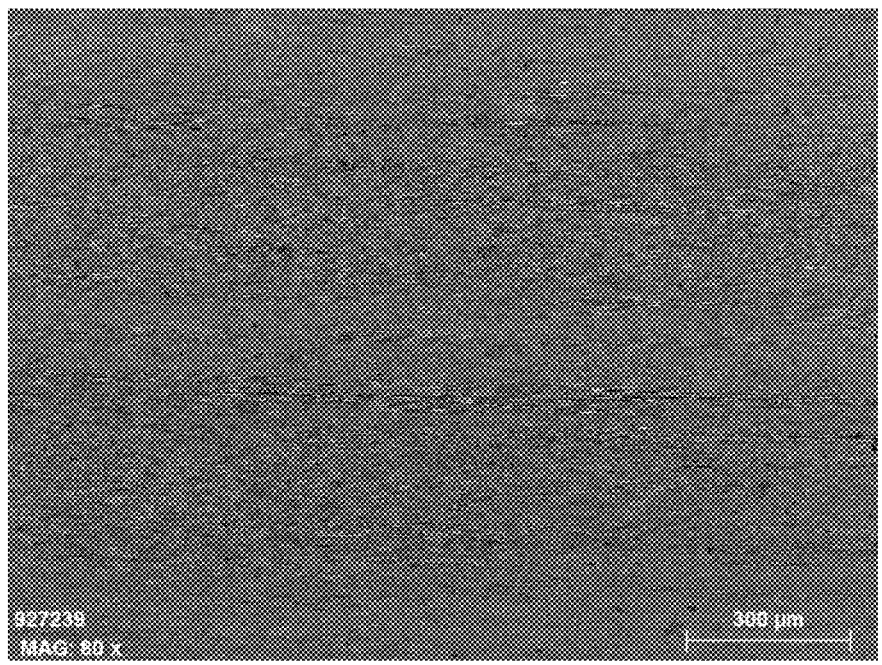
FIG. 9c is an SEM backscattered image of the Example 1 alloy (80× magnification) after laser treatment at 35 kHz.

FIGS. 8a-8d and FIGS. 9a-9c show that samples treated under both pulse frequency conditions 1 and 2 maintained substantially equivalent overall surface roughness before and after their respective laser treatments. Comparing FIG. 10a with FIG. 10b and FIG. 11a with 11b shows a similar result for the pulse frequency condition 2-exposed sample A. Notably, the surface oxide layer of the samples A and B remains unchanged due to the laser treatment at either pulse frequency condition 1 or pulse frequency condition 2. For pulse frequency condition 2-exposed sample A, however, the surface morphology of the samples is modified due to ablation of the intermetallic particles of the 7xxx aluminum alloy sheet products. The laser ablation of the intermetallic particles causes ablation pitting in the surface oxide layer, resulting in the pit-like voids (800) visible in FIGS. 8b, 8d, 9b, 10b, and 11b. By contrast, the pit-like voids (800) are notably absent from the SEM images of laser treatment pulse frequency condition 1-exposed samples, as shown in FIGS. 8c and 9c. Notably, FIG. 8d illustrates a roll grind line (830).

Figure 11B:
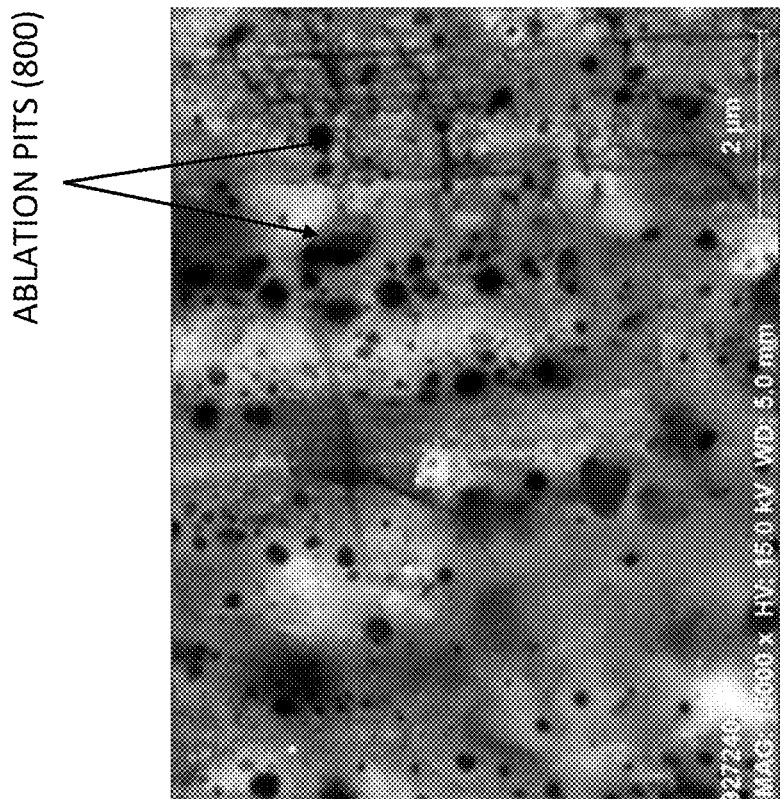
FIGS. 11a and 11b are additional SEM backscatter images of the Example 1 alloy (15000× magnification), prior to laser treatment (FIG. 11a) and after laser treatment at 25 kHz (FIG. 11b).
Figure 11A:
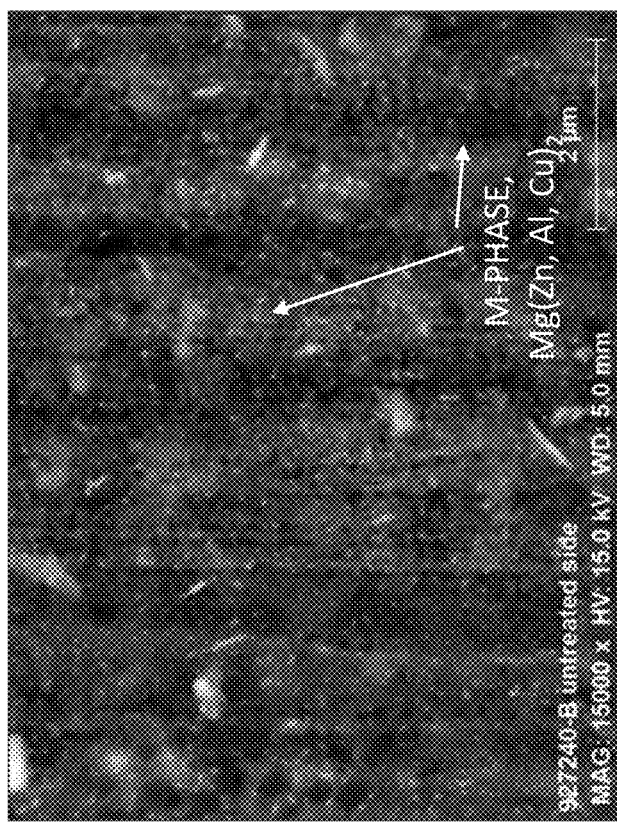

For example, in FIG. 10a, Fe-bearing intermetallic particles are visible as bright particles of up to about 2 μm in size. Also visible in FIGS. 10a and 11a are finer (e.g., smaller in size than those labeled "Fe-bearing") bright particles representing the M-phase Mg(Zn, Al, Cu)$_2$ particles and dispersoids. Further, in FIG. 10a, dark particles represent Mg$_2$Si or pores. In FIGS. 10b and 11b, pit-like voids (800) in the surface show locations of intermetallic particles ablated by action of the laser treatment. The very fine pit-like voids (800) shown in FIGS. 10b and 11b correspond to pre-ablation locations of the M-phase particles Mg(Zn, Al, Cu)$_2$. Mg$_2$Si particles were also ablated, as shown in FIG. 10b.

Figures 12A, 12B:
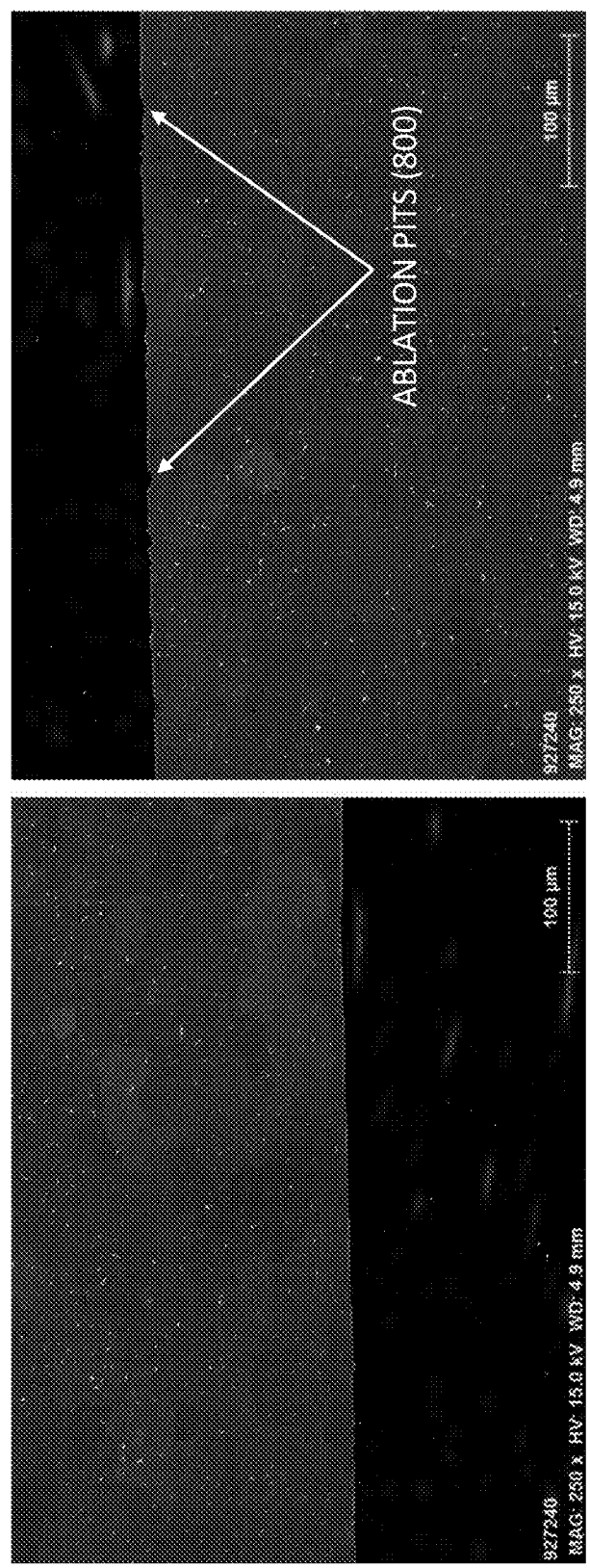
FIGS. 12a and 12b are SEM images of cross sections of the Example 1 alloy (250× magnification), prior to laser treatment (FIG. 12a) and after laser treatment at 25 kHz (FIG. 12b).
Figures 13A, 13B:
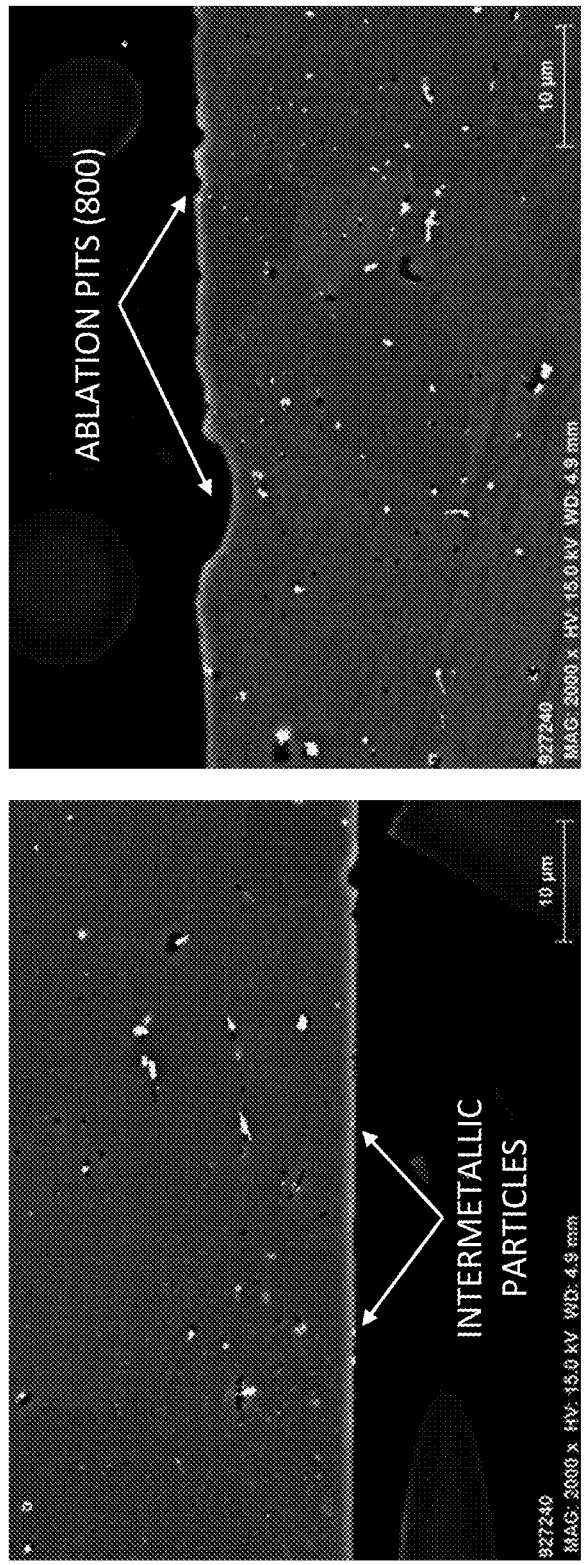
FIGS. 13a and 13b are additional SEM images of cross sections, respectively, of the Example 1 alloy (2000× magnification), prior to laser treatment (FIG. 13a) and after laser treatment at 25 kHz (FIG. 13b).
Figure 15:
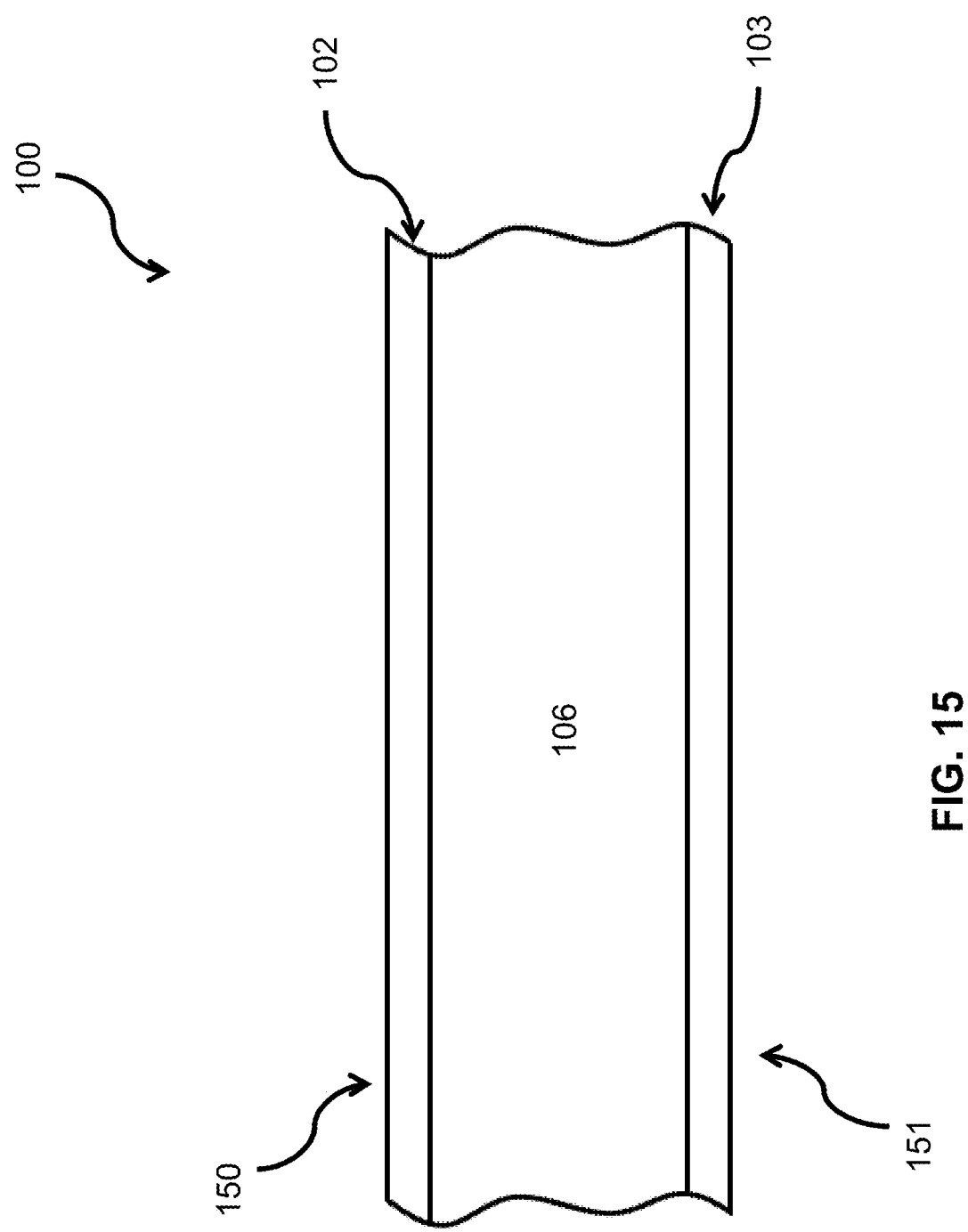
FIG. 15 is a schematic, side-view of a 7xxx aluminum alloy product.

FIGS. 12a and 12b are SEM images (250× magnification) of cross sections of sample A of Example 1 before and after laser treatment at pulse frequency condition 2, respectively. FIG. 13a is an SEM image (250×) of a longitudinal section of sample A before laser treatment at pulse frequency condition 2. FIG. 13b is an SEM image (250×) of a cross section of sample A after laser treatment at pulse frequency condition 2. The pit-like voids (800) are also visible in FIG. 12b. While not being bound by any theory, it is believed the pitting facilitates penetration of the phosphorous-containing organic acid into the oxide during the pretreatment, which facilitates sufficient adhesion of the polymer (e.g., adhesive bonding agent) to the oxide layer.

Further, the laser treatment at pulse frequency condition 2 selectively ablates intermetallic particles without modifying the aluminum matrix underlying the surface oxide layer. This result is seen in comparing FIG. 12a with FIG. 12b, where the overall aluminum alloy grain structure near the surface is not substantially changed after the laser treatment, which indicates that no melting of the aluminum matrix occurred as a result of the laser treatment at pulse frequency condition 2. It was also observed that the laser treatment of sample A at pulse frequency condition 1 ablated the organic components (e.g., residual lubricant) from the surface resulting in a clean surface. Moreover, comparing FIG. 13a with FIG. 13b further illustrates that the pulse frequency condition 2 laser treatment left behind the pit-like voids (800) defining the former volumes of ablated (e.g., volatilized) intermetallic particles (note the relative absence of second phase particles near the surface in FIG. 13b).

It is believed that laser ablation of the intermetallic particles occurred under pulse frequency condition 2 but not condition 1 because of differences between the ability of the intermetallic particles to absorb laser beam energy rapidly enough to volatilize the intermetallic particles. In the case of Example 1 sample B treated under pulse frequency condition 1 (35 kHz), the Al$_7$Cu$_2$Fe-containing intermetallic particles of the 7xxx aluminum alloy sheet sample were not ablated, but those of sample A were when treated under pulse frequency condition 2 (25 kHz). Therefore, given laser beam exposure times that were, at least on average, substantially constant between samples A and B, the laser treatment at 25 kHz facilitated volatilizing the intermetallic particles, while the laser treatment at 35 kHz did not enable ablation by volatilization.

The results of Example 1 demonstrate that acceptable bonding performance (e.g., achieving 45 cycles in the BDT testing specified above) may be achieved without appreciably changing, for instance, the elemental composition (e.g., Mg atomic %), surface oxide layer thickness and/or roughness of 7xxx aluminum alloy products. Moreover, the observed differences in response to laser treatment between the two pulse frequency conditions described above provides for tuning the parameters of the laser treatment for ablating intermetallic particles in various aluminum alloys.

Ablation Pitting

The ablation pits created on the surface of the strip by the inventive treatment were counted on a Secondary Electron (SE) image of the surface. This mode highlights the topographical differences in the sample as shown in FIG. 8d for a typical case. The image was divided into 100×100 micrometer square sections as shown by the grid in FIG. 8e. The number of ablation pits in each of the six full squares was counted and classified into three size groups: (a) less than 5 micrometers, (b) 5 to less than 10 micrometers, and (c) 10 to 20 micrometers (no ablation pits were greater than 20 micrometers for this particular sample). There was substantial variation in the number and size of ablation pits in each square as a result of the alignment of the constituent intermetallic particles in the rolling direction and highly non-uniform distribution shown in FIG. 8b. The ablation pit counts obtained were: 80 pits<5 micrometers, 30 pits in size range between 5 and <10 micrometers, and 7 pits in the 10-20 micrometers size range. The larger ablation pits are generally due to clusters of intermetallic particles. This corresponded to a total of 117 pits over a 0.06 mm$^2$ area or to a pit density of 1950 pits/square mm. It is noted that the ablation pits created by the present method show a rim as is clearly visible in the larger ablation pits. Another point of distinction is the presence of wrinkles (810) on the surface which are likely sub-grain boundaries formed due to the ablation treatment (e.g., the wrinkles may form due to heating of the surface via the energy source). The presence of ablation pits substantially larger than the intermetallic particles of the untreated surface shown in FIG. 8f indicates that the treatment creates a trench around individual particles and clusters get ablated to leave a single larger pit.

Figure 8F:
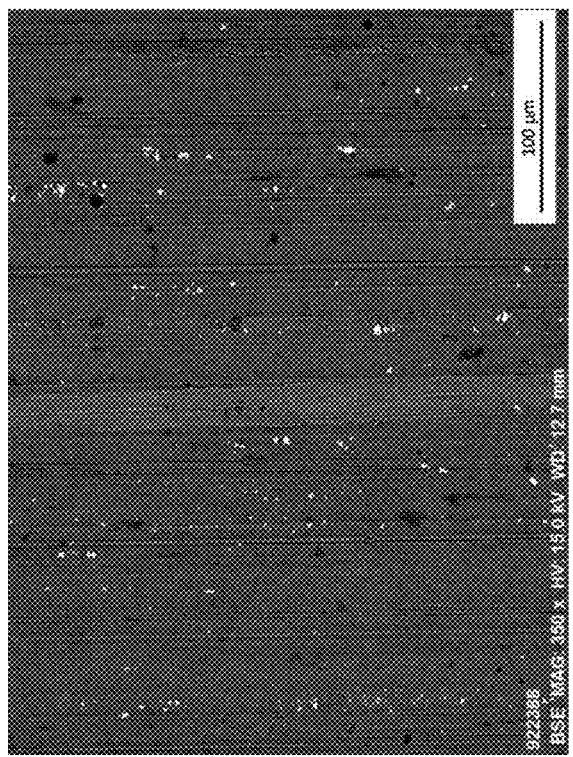
FIG. 8f is a backscattered SEM image of a surface of a conventional (not ablated) 7xxx aluminum alloy sheet product.
Figure 8E:
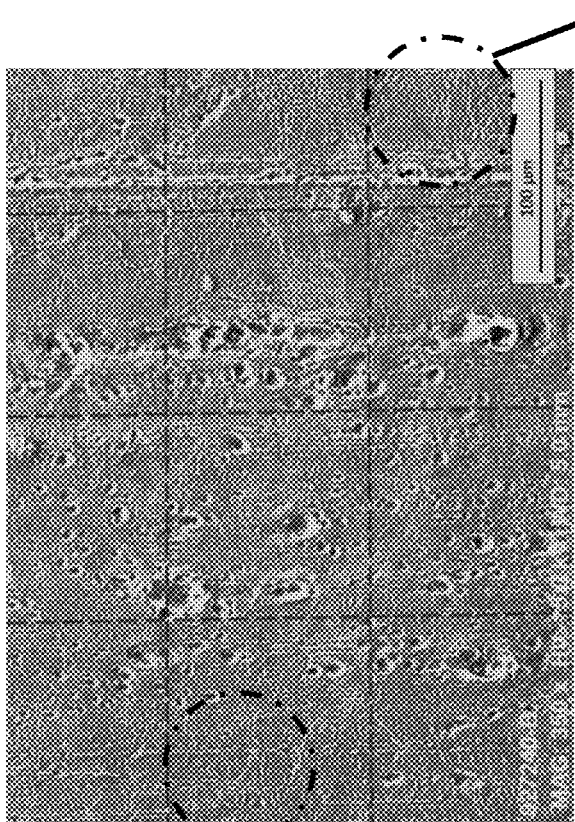
FIG. 8e is a close-up of FIG. 8d.

A typical untreated 7xxx metal surface is shown in FIG. 8f (the same magnification as FIG. 8e), and in Back Scattered Electron (BSE) mode of SEM. The image shows bright constituent particles containing Fe and or Cu on a relatively smooth surface. The particles are generally smaller than 10 micrometers in diameter, aligned in the direction of rolling and often in the form of clusters. Ablation pits and wrinkles are generally absent.

Example 2—Use of a Yb-YAG Laser

Several samples of a 7xxx aluminum alloy product were ablated using a Yb-YAG laser. The laser conditions were similar to those of Example 1. After laser ablation, the samples were examined via SEM. The SEM analysis confirmed that the Yb-YAG laser appropriately ablated the intermetallic particles from the surface, leaving behind the characteristic ablation pits described in Example 1. There was no sign of surface melting in the samples.

After the laser treatment, the samples were functionalized as per Example 1. The samples were then sequentially bonded and subjected to an industry standard cyclical corrosion exposure test, similar to ASTM D1002, which continuously exposes the samples to 1080 psi lap shear stresses to test bond durability. All samples successfully completed the required 45 cycles. The residual shear strengths of the samples, measured after the completion of the exposure test, were around 6000 psi.

Example 3—Bonding of Bare Laser Treated Materials

Some of the laser ablated samples of Example 2 were adhesively bonded after laser ablation, but without being functionalized, i.e., a functionalization layer was not added to the samples. The samples were then subjected to the same industry standard cyclical corrosion exposure test as per Examples 1 and 2. Nearly all of the twelve samples failed the test, with many failing within 30 cycles. Thus, laser ablation alone does not appear to facilitate production of appropriate 7xxx aluminum alloy products for adhesive bonding. A functionalization step/a functionalization layer appears necessary.

Example 4—Etching Instead of Functionalization

Some of the laser ablated samples of Example 2 were prepared for adhesive bonding by a chemical etching in a dilute acid solution prior to bonding, but without being functionalized, i.e., a functionalization layer was not added to the samples. The samples were then subjected to the same industry standard cyclical corrosion exposure test as per Examples 1 and 2. All of the eight samples failed the test within 19 cycles. Thus, an oxide etch is not a suitable substitute for a functionalization treatment.

Whereas particular embodiments of this disclosure have been described above for purposes of illustration, it will be evident to those skilled in the art that numerous variations on the details of the present disclosure may be made without departing from the scope of the disclosure as defined in the appended claims.

What is claimed is:

1. A method for preparing magnesium-containing aluminum alloy products for adhesive bonding, the method comprising:
    (a) receiving a magnesium-containing aluminum alloy product, wherein the magnesium-containing aluminum alloy product comprises a matrix and a surface oxide layer overlying the matrix;
        (i) wherein the surface oxide layer comprises an as-received thickness;
        (ii) wherein the magnesium-containing aluminum alloy product comprises intermetallic particles proximal the surface oxide layer; and
        (iii) wherein the intermetallic particles comprise Cu-bearing intermetallic particles; and
    (b) laser ablating at least some of the intermetallic particles and in the absence of melting of the matrix of the magnesium-containing aluminum alloy product.

2. The method of claim 1, wherein the laser ablating step comprises volatilizing the intermetallic particles.

3. The method of claim 1, wherein, after the laser ablating step, the magnesium-containing aluminum alloy product comprises an ablated portion having a plurality of ablation voids proximal the surface oxide layer.

4. The method of claim 3, wherein the intermetallic particles define pre-ablation volumes, and wherein, due to the laser ablating, at least some of the plurality of ablation voids are greater in volume than the pre-ablation volumes.

5. The method of claim 1, wherein the intermetallic particles have a size of from 100 nm to 10 µm.

6. The method of claim 1, wherein the laser ablating step comprises maintaining the surface oxide layer at the as-received thickness.

7. The method of claim 1, wherein the surface oxide layer comprises MgO.

8. The method of claim 7, wherein, after the laser ablating step, the surface oxide layer comprises at least 10 atomic % Mg.

9. The method of claim 1, comprising selectively laser ablating at least some of the intermetallic particles during the laser ablating step, thereby creating an ablated portion surrounded by an unablated portion.

10. The method of claim 1, comprising:
(a) determining locations of the intermetallic particles; and
(b) selectively laser ablating at least some of the located intermetallic particles during the laser ablating step.

11. The method of claim 1, comprising:
determining at least one bonding location associated with the magnesium-containing aluminum alloy product; and
after the determining step, completing the laser ablating step relative to the at least one bonding location, thereby creating an ablated portion.

12. The method of claim 11, wherein, after the laser ablating step, the magnesium-containing aluminum alloy product comprises the ablated portion surrounded by an unablated portion.

13. The method of claim 12, comprising, after the laser ablating step, contacting the magnesium-containing aluminum alloy product with a functionalization solution.

14. The method of 12, comprising selectively contacting the ablated portion with a functionalization solution, thereby creating a pretreated portion of the magnesium-containing aluminum alloy product.

15. The method of claim 14, wherein the selectively contacting step comprises restricting contact between the unablated portion and the functionalization solution.

* * * * *